US012625506B1

(12) United States Patent
Yen

(10) Patent No.: US 12,625,506 B1
(45) Date of Patent: May 12, 2026

(54) PROCEDURES FOR DOCKING WITH STATIONS BY AERIAL VEHICLES

(71) Applicant: Amazon Technologies, Inc., Seattle, WA (US)

(72) Inventor: Hsiao-Chieh Yen, Taipei City (TW)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 18/542,021

(22) Filed: Dec. 15, 2023

(51) Int. Cl.

| | |
|---|---|
| *G05D 1/654* | (2024.01) |
| *B64D 45/08* | (2006.01) |
| *B64U 70/95* | (2023.01) |
| *B64U 101/30* | (2023.01) |
| *G05D 1/242* | (2024.01) |
| *G05D 1/243* | (2024.01) |
| *G05D 1/244* | (2024.01) |
| *G05D 1/245* | (2024.01) |
| *G05D 1/46* | (2024.01) |
| *G05D 109/25* | (2024.01) |
| *G05D 111/10* | (2024.01) |
| *G05D 111/50* | (2024.01) |

(52) U.S. Cl.
CPC ........... *G05D 1/6545* (2024.01); *B64D 45/08* (2013.01); *B64U 70/95* (2023.01); *G05D 1/242* (2024.01); *G05D 1/243* (2024.01); *G05D 1/244* (2024.01); *G05D 1/245* (2024.01); *G05D 1/46* (2024.01); *B64U 2101/30* (2023.01); *G05D 2109/254* (2024.01); *G05D 2111/10* (2024.01); *G05D 2111/52* (2024.01)

(58) Field of Classification Search
CPC ........ G05D 1/6545; G05D 1/242; G05D 1/46; G05D 1/245; G05D 1/243; G05D 1/244; G05D 2111/52; G05D 2109/254; G05D 2111/10; B64U 70/95; B64U 2101/30; B64D 45/08
See application file for complete search history.

(56) References Cited

U.S. PATENT DOCUMENTS

| | | | |
|---|---|---|---|
| 9,139,310 | B1 | 9/2015 | Wang |
| 9,527,605 | B1 | 12/2016 | Gentry et al. |
| 10,274,952 | B2 | 4/2019 | Cantrell et al. |
| 10,577,126 | B2 | 3/2020 | Mozer |
| 10,633,115 | B2 | 4/2020 | Pilskalns |
| 10,710,707 | B2 | 7/2020 | Chen |
| 10,843,573 | B2 | 11/2020 | Chen et al. |

(Continued)

*Primary Examiner* — Michael D Lang
(74) *Attorney, Agent, or Firm* — Athorus, PLLC

(57) ABSTRACT

A procedure for docking an aerial vehicle at a docking station includes multiple phases. In a first phase, the aerial vehicle begins a descent at a position over a prior position of the docking station, and monitors a pose using navigation sensors and images captured from below the aerial vehicle. The docking station includes visual markings in a pattern. The aerial vehicle detects the markings within the images, and determines poses based on the pattern. When the poses converge, the docking evolution proceeds to a second phase, during which the aerial vehicle determines poses using images and inertial sensors. When the aerial vehicle reaches an altitude below which the markings do not appear within the field of view of the camera, the docking evolution proceeds to a third phase, during which the aerial vehicle determines poses using images, inertial sensors and range data, until the aerial vehicle is docked.

25 Claims, 18 Drawing Sheets

(56) References Cited

U.S. PATENT DOCUMENTS

| | | | |
|---|---|---|---|
| 10,913,546 B2 | 2/2021 | Krauss et al. |
| 11,148,805 B2 | 10/2021 | Cooper et al. |
| 11,180,263 B2 | 11/2021 | Ratajczak et al. |
| 11,247,775 B2 | 2/2022 | Brock et al. |
| 11,453,498 B2 | 9/2022 | Martens |
| 11,518,542 B2 | 12/2022 | Ducharme et al. |
| 11,673,690 B2 | 6/2023 | Dayan et al. |
| 11,873,116 B2 | 1/2024 | Kozlenko et al. |
| 11,912,438 B2 | 2/2024 | Wankewycz et al. |
| 11,939,080 B2 | 3/2024 | Cowden |
| 12,134,329 B2 | 11/2024 | Todeschini |
| 12,163,297 B1 | 12/2024 | Airoldi |
| 12,172,777 B2 | 12/2024 | Carthew et al. |
| 12,183,940 B2 | 12/2024 | Bell |
| 12,202,634 B1 | 1/2025 | England et al. |
| 12,205,483 B1 | 1/2025 | Cao et al. |
| 2007/0228214 A1 | 10/2007 | Horak |
| 2012/0271461 A1 | 10/2012 | Spata |
| 2012/0271491 A1 | 10/2012 | Spata |
| 2015/0069968 A1 | 3/2015 | Pounds |
| 2016/0001883 A1 | 1/2016 | Sanz et al. |
| 2016/0039300 A1 | 2/2016 | Wang et al. |
| 2016/0039541 A1 | 2/2016 | Beardsley et al. |
| 2016/0144982 A1 | 5/2016 | Sugumaran |
| 2016/0311329 A1 | 10/2016 | Rodriguez |
| 2017/0050749 A1 | 2/2017 | Pilskalns |
| 2017/0073084 A1 | 3/2017 | Mozer |
| 2017/0217323 A1 | 8/2017 | Antonini et al. |
| 2018/0056794 A1 | 3/2018 | Kim et al. |
| 2019/0308724 A1 | 10/2019 | Cooper et al. |
| 2020/0031472 A1 | 1/2020 | Martens |
| 2020/0031473 A1 | 1/2020 | Martens |
| 2020/0207470 A1 | 7/2020 | Brock et al. |
| 2021/0031947 A1 | 2/2021 | Wankewycz et al. |
| 2021/0094687 A1 | 4/2021 | Brock et al. |
| 2021/0347500 A1 | 11/2021 | Hagan |
| 2022/0134899 A1 | 5/2022 | Eide et al. |
| 2023/0373668 A1 | 11/2023 | Kozlenko et al. |
| 2024/0176366 A1 * | 5/2024 | Mclaughlin .............. G08G 5/54 |
| 2024/0278946 A1 | 8/2024 | Roberts |
| 2024/0308688 A1 | 9/2024 | Ratajczak et al. |
| 2024/0343426 A1 | 10/2024 | Cornew et al. |

* cited by examiner $(T_{DRONE})^{DOCK} = (x,y,z, \theta, \psi, \phi)CAM$

DRONE-TO-DOCK POSE

IMAGES

DETERMINE DOCK-TO-MAP
POSE FROM CONVERGENT POSES
$(T_{DOCK})MAP = (x,y,z, \theta, \psi, \phi)$ $(T_{DRONE})MAP \longleftrightarrow (T_{DRONE})DOCK$ $(T_{DRONE})^{DOCK} = (x,y,z, \theta, \psi, \phi)_{CAM} + (x,y,z, \theta, \psi, \phi)_{INERT}$

CONTINUOUSLY UPDATE DRONE-TO-DOCK POSE

PROCEDURES FOR DOCKING WITH STATIONS BY AERIAL VEHICLES

BACKGROUND

Aerial vehicles are most commonly operated in outdoor spaces. When an aerial vehicle operates in an outdoor space, the aerial vehicle may take off from a fixed or mobile location, e.g., a runway, a landing pad, or any like facility or station, by causing motors to generate lift and elevate the aerial vehicle to a selected altitude or position. The aerial vehicle may then travel on any selected courses, speeds or altitudes. Prior to taking off, or while in flight, an aerial vehicle operating outdoors may determine its position in three-dimensional space using a position sensor, e.g., a Global Positioning System ("GPS") receiver that captures signals from one or more satellites or other sources, as well as an inertial measurement unit (or "IMU"), one or more altimeters, barometers, or other components. An aerial vehicle may rely on such sensors to travel to a specific location, which may be the same location from which the aerial vehicle took off, or a different location, before completing a landing evolution.

Operating an aerial vehicle, or drone, within indoor spaces presents a unique set of challenges for the aerial vehicle, and creates unique risks for occupants or contents of the indoor spaces. In particular, whereas aerial vehicles that operate outdoors may commonly utilize large, open areas to maneuver during takeoff and landing evolutions, an aerial vehicle that operates indoors, which are often constrained by narrow hallways or other passageways, and feature limited operating areas between floors and ceilings, must usually maneuver and execute takeoff or landing evolutions with precision.

BRIEF DESCRIPTION OF THE DRAWINGS

FIGS. 1A through 1L are views of aspects of one system in accordance with embodiments of the present disclosure.

DETAILED DESCRIPTION

Figure 1A:
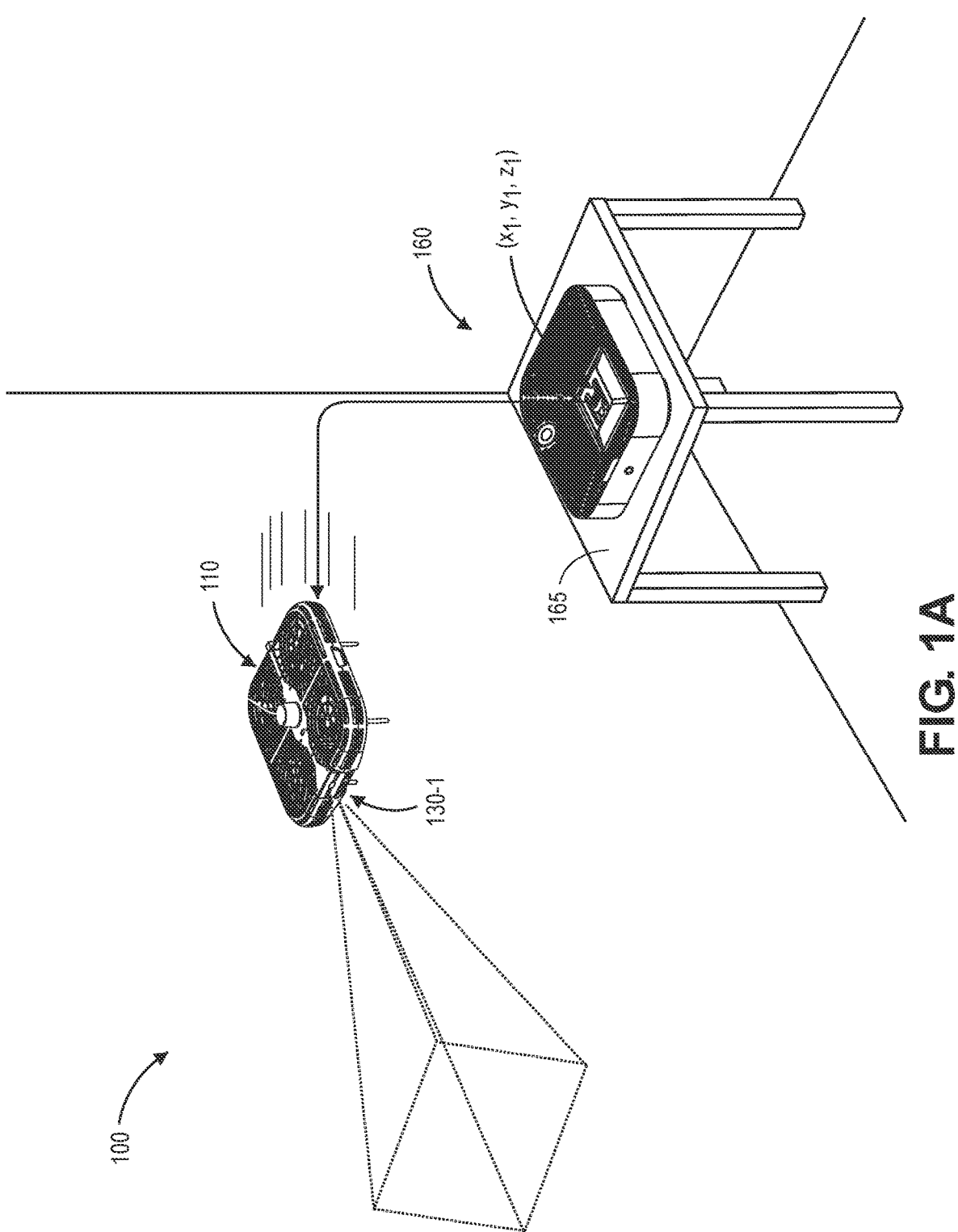

As is set forth in greater detail below, the present disclosure is directed to landing procedures for aerial vehicles (e.g., drones) that are configured for operation within indoor spaces. More specifically, the present disclosure is directed to processes or techniques for causing an aerial vehicle to land on, or dock on, a docking station following operations within indoor spaces. The processes or techniques include multiple phases during which an aerial vehicle may rely on data captured or generated by multiple sensors to aid the aerial vehicle in safe operations at various altitudes prior to landing. In some implementations, the aerial vehicle may travel to an initial position that is located at a selected altitude over a last known position of a docking station from which the aerial vehicle departed, or onto which the aerial vehicle intends to land. The aerial vehicle may travel to the initial position using one or more navigation sensors, e.g., LIDAR sensors, time-of-flight sensors, imaging devices, or others, which may capture data and interpret the data to cause the aerial vehicle to travel along or in a manner consistent with navigation maps that were generated during prior operations of the aerial vehicle or at any other time.

In a first phase, the aerial vehicle begins a descent from the initial position toward a transition position, and determines poses (e.g., positions and orientations) during the descent using not only navigation sensors but also imaging data captured using downward-oriented cameras of the aerial vehicle. For example, where the aerial vehicle is programmed with a navigation map, and captures data regarding an environment using the one or more navigation sensors, the aerial vehicle may determine a position and an orientation with respect to the navigation map, or another reference frame, based on the captured data and the navigation map. Likewise, where the docking station includes a plurality of visual markings arranged in a predetermined pattern, the aerial vehicle may be programmed with information or data regarding the visual markings, including their appearance and locations with respect to one another within the predetermined pattern. When the aerial vehicle captures images using a downward-oriented camera during a descent, the aerial vehicle may determine a position and an orientation with respect to the docking station by detecting the visual markings within the images. The aerial vehicle may then determine a pose of the docking station with respect to the navigation map based on the pose of the aerial vehicle with respect to the navigation map, as determined using the navigation sensors, and the pose of the aerial vehicle with respect to the docking station, as determined using the downward-oriented cameras.

An estimate of a pose of a docking station with respect to global or other coordinate systems may be composed from poses determined with respect to a navigation map using navigation sensors and/or a simultaneous localization and mapping algorithm, and a pose determined based on images captured using one or more downward-oriented cameras. Once estimates of poses determined with respect to a navigation map using the navigation sensors and poses determined with respect to the docking station based on images captured using the downward-oriented cameras have converged, the aerial vehicle may transition to a second phase in which the aerial vehicle determines a pose of the docking station with respect to the navigation map based on the convergent poses at or prior to the transition position. While descending below the transition position, the aerial vehicle continues to update its pose with respect to the navigation map based on data captured using navigation sensors, and further updates its pose with respect to the docking station with images captured using the downward-oriented cameras and also data generated by inertial sensors provided aboard the aerial vehicle. The aerial vehicle then determines poses of the docking station with respect to the navigation map based on such poses at regular intervals or times, and compares such poses to the pose of the docking station with respect to the navigation map calculated at the transition position.

The inertial sensors may include one or more gyroscopes (e.g., mechanical or electrical components or instruments for determining an orientation), one or more accelerometers (e.g., mechanical or electrical components or instruments for sensing or measuring accelerations), one or more compasses or other magnetometers (e.g., mechanical or electrical components or instruments for determining one or more directions with respect to a frame of reference that is fixed with respect to the surface of the Earth), or other components. In the event that poses determined using the navigation sensors and poses determined based on images captured using downward-oriented cameras do not converge, however, the aerial vehicle may abort the docking evolution, return to the initial position and attempt the docking evolution again, or attempt to land in a different location. The aerial vehicle may adjust its position or orientation, as necessary, to align the aerial vehicle with the docking station during the second phase, until the aerial vehicle reaches an altitude below which one or more of the visual markings of the docking station do not appear within a field of view of a downward-oriented camera.

During the second phase, the aerial vehicle may determine poses of the docking station with respect to a world, or a navigation map, based on the poses of the aerial vehicle with respect to the docking station, as determined using the downward-oriented cameras and the inertial sensors, as well as the poses of the aerial vehicle with respect to the environment, as determined using the navigation map and navigation sensors. The aerial vehicle may update the navigation map and recalculate poses of the aerial vehicle with respect to the environment, as necessary.

In a third phase, the aerial vehicle may continue a descent and determine poses using inertial sensors, and a downward-oriented range sensor, e.g., a time-of-flight sensor, until the aerial vehicle contacts the docking station. The third phase may begin at a position that is comparatively close to the docking station, within which a field of view of a downward-oriented camera may be incapable of capturing each of the visual sensors provided in association with the docking station within a single image.

The docking stations of the present disclosure may provide support for aerial vehicles prior to or following the performance of any number of operations or evolutions by the aerial vehicles within indoor spaces. For example, one or more of the docking stations of the present disclosure may be utilized by an aerial vehicle that is programmed or configured to monitor any events or conditions occurring within an indoor space, or to confirm or verify the existence or presence of any such events or conditions, e.g., any hazardous, abnormal or undesirable events or conditions, or evaluate the spaces regularly or periodically, or at scheduled or random times.

Visual markings or indicators may be arranged within depressions or cavities of docking stations in an asymmetric, unique pattern that may be detected within images captured by one or more cameras of the aerial vehicle prior to or during a descent to the docking station. Upon detecting the markings or indicators of the docking station, the aerial vehicle may adjust a pose, e.g., by rotating or otherwise adjusting the aerial vehicle to ensure that the aerial vehicle remains in proper alignment with the docking station. The markings or indicators provided within such cavities may be passive or active in nature, and may take any form, such as reflectors of light (e.g., retroreflectors), light sources (e.g., light-emitting diodes, or "LED"), symbols, characters, or others.

Referring to FIGS. 1A through 1L, views of aspects of one system in accordance with embodiments of the present disclosure are shown. As is shown in FIG. 1A, an aerial vehicle 110 takes off from a docking station 160 provided within a scene (or environment) 100, which may include any number of indoor spaces. The aerial vehicle 110 includes one or more propulsion motors, control surfaces or other components for enabling the aerial vehicle 110 to take off from or land on the docking station 160, or to otherwise travel at one or more selected altitudes, on one or more selected courses or at one or more selected speeds. The docking station 160 is provided on a table 165, which may be any structure or component having one or more surfaces for accommodating the docking station 160 or any other objects thereon. As is also shown in FIG. 1A, the aerial vehicle 110 took off from the docking station 160 at a position represented by a set of coordinates $(x_1, y_1, z_1)$ in three-dimensional space. Alternatively, or in addition to the table 165, the scene 100 may include any number of other static or dynamic objects (e.g., articles of furniture, humans, animals such as pets, or any others).

The aerial vehicle 110 may take off from the docking station 160 to perform any number of missions on the scene 100. For example, the aerial vehicle 110 may be outfitted or equipped with one or more cameras 130-1 or other imaging devices that are aligned to capture imaging data during flight of the aerial vehicle 110. In some implementations, the imaging data may be captured or processed to identify, or to confirm or verify, the existence of one or more events or conditions within spaces of the scene 100 that may require support or assistance. Such events or conditions may include, but need not be limited to, break-ins or other security breaches or violations, as well as fires or flooding conditions of any kind, or any other hazardous, abnormal or undesirable events or conditions.

Figure 1B:
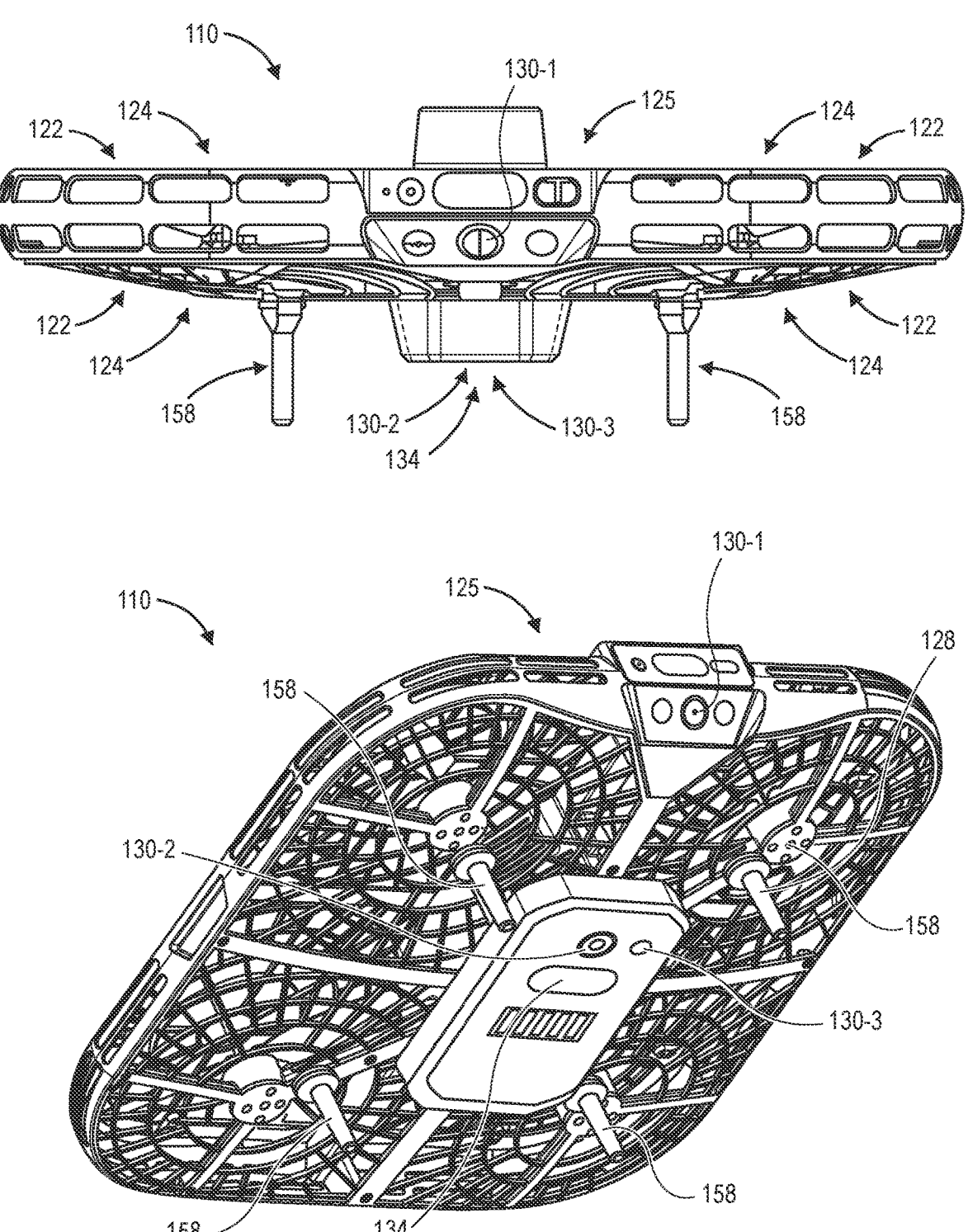

FIG. 1B shows a front view of an aerial vehicle 110 and a perspective view of an underside of the aerial vehicle 110. As is shown in FIG. 1B, the aerial vehicle 110 defines a housing having a plurality of propulsion motors 122 disposed therein. Each of the propulsion motors 122 may be powered by electricity or any other fuel source or prime mover, and coupled to a propeller 124. The propulsion motors 122 may be capable of generating sufficient rotational speeds of the propellers 124 or other components to provide thrust and/or lift forces to the aerial vehicle 110 and any payload engaged thereby.

The aerial vehicle 110 also includes an inertial measurement unit 125, which may be installed or embedded within a frame or one or more appurtenances of the aerial vehicle 110 and provided in association with an inertial navigation system, a control system, or any other aspect or component of the aerial vehicle 110. For example, the inertial measurement unit 125 may be configured to detect changes in linear or rotational motion of the aerial vehicle 110, e.g., based on data regarding accelerations experienced by the aerial vehicle 110, angular velocities of the aerial vehicle 110, or magnetic fields sensed by the aerial vehicle 110, using one or more gyroscopes, accelerometers and/or compasses provided therein.

The aerial vehicle 110 further includes a camera 130-1 having a field of view with an axis of orientation that extends normal from a substantially flat face that is angled in a downward direction with respect to the housing of the aerial vehicle 110, e.g., below a plane including pitch and roll axes of the aerial vehicle 110. The aerial vehicle 110 also includes a camera 130-2 having a field of view with an axis of orientation that extends normal from a substantially flat face on an underside of a housing of the aerial vehicle 110, e.g., along or parallel to a yaw axis of the aerial vehicle 110. Alternatively, either or both of the cameras 130-1, 130-2 may be aligned with fields of view or axes of orientation extending in any direction or orientation with respect to the aerial vehicle 110, e.g., forward, aft, port, starboard, up, down, or in any other direction, or the yaw, pitch or roll axes of the aerial vehicle 110 vehicle, or at any other angle or orientation. The cameras 130-1, 130-2 may be aligned with fixed orientations, or with variable orientations (e.g., rotating or shifting orientations). The aerial vehicle 110 further includes one or more illuminators 134 provided on the underside of the housing of the aerial vehicle 110. The illuminators 134 may include one or more light-emitting diodes (or "LED"), incandescent bulbs, compact and/or linear fluorescent bulbs, halogen lamps, metal halide lamps, neon lamps, sodium lamps or any other type or form of lights configured to project visible light at any frequency, wavelength or intensity below the aerial vehicle 110 during airborne operations of the aerial vehicle 110. For example, in some implementations, where visual markers on the docking station 160 are retroreflective in nature, light projected below the aerial vehicle 110 by the illuminators 134 may enhance the visibility of the visual markings, and enable such markings to be more readily detected within imaging data captured using the camera 130-2.

Each of the cameras 130-1, 130-2 may be configured to capture visual imaging data or depth imaging data with respect to objects or features that are present within their respective fields of view. In some implementations, imaging data captured by the cameras 130-1, 130-2 may be processed to identify or detect one or more boundaries or other features of objects, e.g., based on one or more edges, contours, outlines, colors, textures, silhouettes, shapes or other characteristics of objects depicted within the imaging data. In some implementations, imaging data captured by the cameras 130-1, 130-2 may likewise be interpreted to detect objects within an indoor space, to calculate distances or ranges to such objects, or to identify boundaries, edges or other features of such objects.

As is further shown in FIG. 1B, the aerial vehicle 110 includes a range sensor 130-3, e.g., a time-of-flight sensor, having an axis of orientation that also extends normal from the same substantially flat face on the underside of the housing of the aerial vehicle 110 as the camera 130-2. In some implementations, the range sensor 130-3 may be a single-point sensor that is configured to transmit light and capture reflections of the light to calculate a distance to a single point. In some implementations, the range sensor 130-3 may be configured to transmit and receive light within a pyramidal field of view, which may be defined by any angle, e.g., approximately forty-five degrees, or any other angle. The aerial vehicle 110 may interpret any received light in a map defined by a grid having a plurality of cells arranged in rows and columns, e.g., a grid of sixteen cells in four rows and four columns, and determine ranges or distances to surfaces corresponding to respective cells of the grid. Upon receiving data regarding one or more returns of reflections of transmitted light, the range sensor 130-3 may determine a distance to an object, based on an elapsed time between transmissions and returns, or in any other manner.

The aerial vehicle 110 further includes a plurality of landing pegs (or struts, or feet) 158, which extend below the underside of the aerial vehicle 110 and are provided in a predetermined arrangement.

Figure 1C:
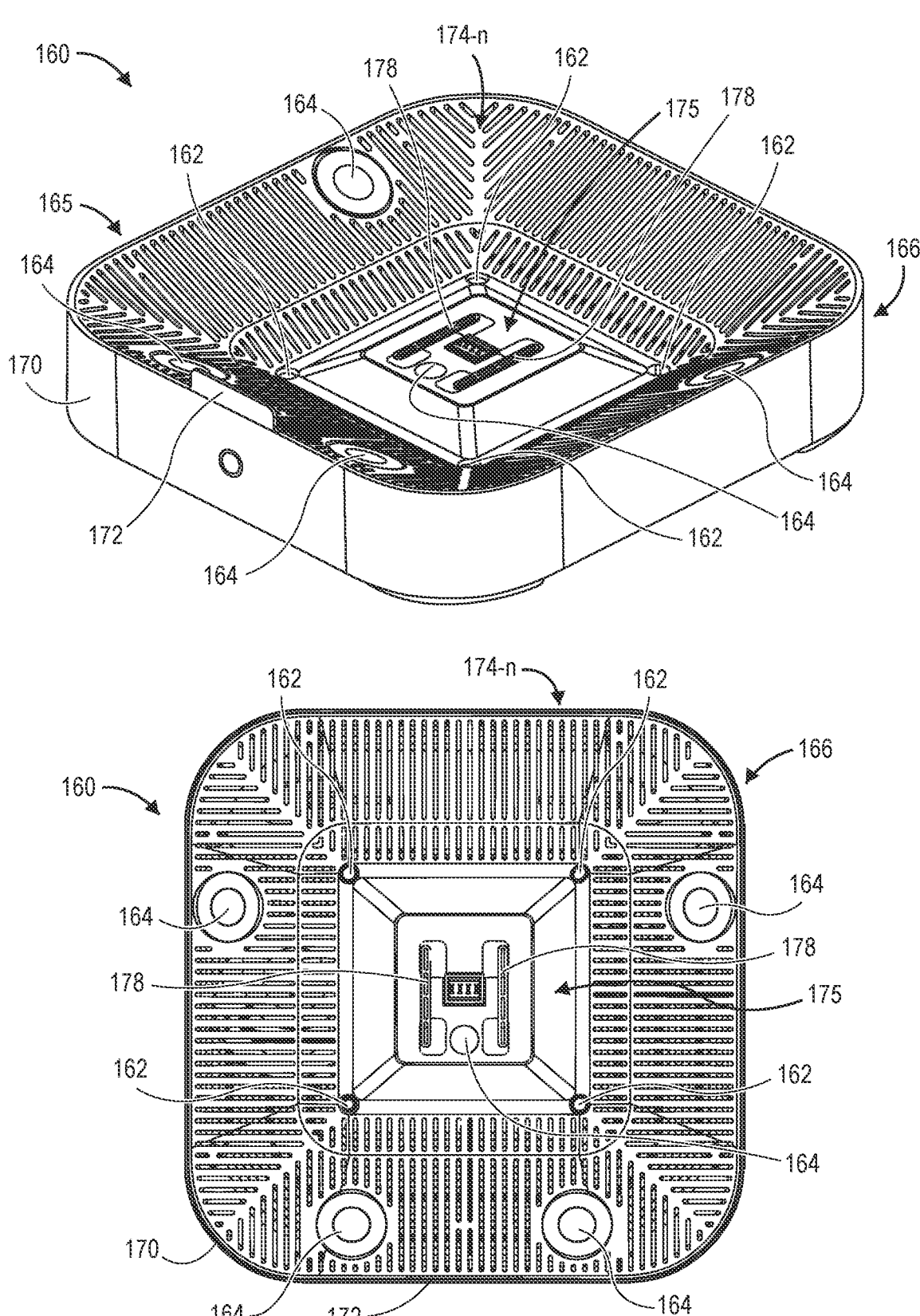

FIG. 1C is a perspective view of a docking station 160. As is shown in FIG. 1C, the docking station 160 includes a frame 166 and a housing 170. The frame 166 defines a depression 175 or another cavity for accommodating portions of the aerial vehicle 110 therein. The frame 166 includes an upper edge, a bottom section having a shape of a square, or a shape similar to that of a square (e.g., a rounded square, or squircle), and a plurality of angled edge sections having a sloped surface descending down at angles from the upper edge to the bottom section. The frame 166 further includes a plurality of receptacles (or recesses or other openings) 162 that are sized and aligned to accommodate the landing pegs 158, struts, landing feet or other appurtenances at ends of landing extensions of the aerial vehicle 110 therein, as well as a plurality of markers (or markings) 164 within the depression 175 formed by the angled edge sections and the bottom section. The markers 164 may be visual in nature and may include any letter, symbol, icon or other indicator that may be detected within images captured by a camera of the aerial vehicle 110, e.g., the camera 130-2. In some implementations, one or more of the markers 164 may include any number of reflective surfaces or other features (e.g., retroreflectors) that enhance the capacity of the markers 164 to be detected within such images.

In some implementations, one or more of the markers 164 may be sources of light, such as a light-emitting diode, or "LED," that project visual light that may be detected by the camera 130-2 or any other optical sensors of the aerial vehicle 110. In such implementations, the camera 130-2 may be a visual camera or, alternatively, an infrared camera that is configured to detect light or heat generated by the respective markers 164. Moreover, in some implementations, the markers 164 may include or be replaced by transmitters of any type or form of energy, e.g., short-range wireless radiofrequency transmissions, that may be captured by one or more sensors configured to receive such energy and determine distances between such sensors and such transmitters, e.g., based on times of flight of such energy.

Attributes or features of the frame 166 may be selected to cause the aerial vehicle 110 to slide or otherwise reposition within the depression 175, subject to gravitational forces, when attempting to dock with the docking station 160. For example, the placement or the arrangement of the receptacles 162 within the depression 175, e.g., in a shape of a square or another rectangle, may be selected based on positions of the ends of landing pegs 158 of the aerial vehicle 110 that is intended to dock with the docking station 160. Slopes of the angled edge sections and dimensions of the bottom section may be selected to cause the aerial vehicle 110 to travel into a proper alignment with respect to the docking station 160, such as when one or more of the landing extensions is in contact with one or more of the angled edge sections. Moreover, materials from which the angled edge sections and the bottom section are formed may be selected based on their respective properties of friction. For example, in some implementations, an upper surface of the frame 166, or other portions of the frame 166, may be formed from any type of plastics (e.g., low-friction plastics) having desired properties of friction, including but not limited to low-friction plastics such as nylons, polyethylenes such as polyethylene sulfide, polyethylene terephthalate or other thermoplastics, polyetheretherketones, polytetrafluoroethylenes, or others.

The placement and the arrangement of the receptacles 162, the angles of the frame 166 and the materials from which the frame 166 and the landing extensions are formed may thus enhance the reliability of the docking station 160 and require less precision from aerial vehicles 110 attempting to complete docking evolutions within the docking station 160.

The housing 170 includes a substantially flat base (not shown in FIG. 1A) and a plurality of walls extending normal to the base. The walls of the housing 170 define an upper rim that mates with or contacts the upper edge of the frame 166. The housing 170 further includes a raised extension 172 (or privacy cover or privacy member) extending from and above one of the walls of the housing 170 that extends above the upper edge of the frame 166. Additionally, the angled edge sections and the bottom section of the frame 166 further include a plurality of openings 174-$n$ (e.g., slits or slit openings) that are aligned or arranged in groups in parallel. The openings 174-$n$ enable downward airflow from the aerial vehicle 110 to pass through the frame 166 and discharge laterally outwardly therefrom when the aerial vehicle 110 is taking off, landing on or into, or otherwise hovering over the docking station 160. The openings 174-$n$ may also provide ventilation for any electronic components provided within the frame 166, e.g., power or communications systems for providing electrical power or data to aerial vehicles 110. For example, as is shown in FIG. 1C, each of the openings 174-$n$ provided in one of the edge sections is oriented such that a lengthwise direction of each of the openings 174-$n$ is aligned in a direction of a slope of the edge section in which the openings 174-$n$ are provided.

The flat surfaces of the frame 166 may also include one or more contacts (or connectors, e.g., charging contacts or charging connectors) 178 or other features for mating with corresponding contacts (or connectors) of the aerial vehicle 110, such as one or more contacts (or connectors, e.g., charging contacts or charging connectors) provided on an underside or other portion of the aerial vehicle 110 that is inserted into or enters the cavity defined by the frame 166. The contacts 178 enable electrical power, information or data to be conveyed between the aerial vehicle 110 and the docking station 160. The housing 170 may further include one or more openings to facilitate the carrying of the docking station 160 by hand.

The plurality of receptacles 162 are provided at corners of the bottom section of the frame 166, and arranged in a shape of a square or another rectangle. For example, as is shown in FIG. 1C, each of the receptacles 162 is provided within a channel defined by the bottom section of the frame, or at the intersection of two of such channels. The channels are arranged in the shape of a square or another rectangle about the bottom section of the frame 166.

The plurality of markers 164 includes five markers provided at various locations on upper surfaces of the frame 166 and in a discrete arrangement, e.g., in a shape of a letter W, that is irregular or asymmetric with respect to one or more axes and is uniquely oriented with respect to a position and an orientation of the docking station 160. In some implementations, an arrangement of the markers 164 may have any aspect ratio, which may be selected based on attributes of the camera 130-2 of an aerial vehicle 110, e.g., an aspect ratio of a field of view of the camera 130-2, that is configured to capture images of the markers 164. Thus, when the aerial vehicle 110 attempts a docking evolution at the docking station 160, and the camera 130-2 or other imaging devices of the aerial vehicle 110 captures an image of the frame 166, the aerial vehicle 110 may detect the markers 164 at various locations on the upper surface of the frame 166. The aerial vehicle 110 may then determine an orientation of the docking station 160 from such markings, and may reorient itself with respect to the docking station 160 as necessary, e.g., by traveling to a selected position and rotating about a yaw axis, prior to or during a descent in order to complete a docking evolution based on the detected orientation of the docking station 160. In some implementations, the aerial vehicle 110 may be in an appropriate orientation with respect to the docking station 160 where a central one of the markers 164 is directly below the camera 130-2 during a descent of the aerial vehicle 110, and when the other markers 164 are arranged in a lengthwise orientation such that the pair of the markers 164 on opposite sides of the housing 170 are aligned in parallel with the pair of the markers 164 provided on a single side of the housing 170, and that both of the pairs of the markers 164 are aligned in parallel with the widths or widest portions of the field of view of the camera 130-2. In some other implementations, however, the markers 164 may be provided in any other arrangement, and the aerial vehicle 110 may be programmed to detect such markers 164 and recognize the arrangement within imaging data captured using the camera 130-2.

Alternatively, in some implementations, where the plurality of markers 164 include one or more transmitters, and where the aerial vehicle 110 includes one or more sensors or other receivers, the aerial vehicle 110 may capture transmissions of the radiofrequency energy by such transmitters and determine distances to such transmitters from such transmissions. The aerial vehicle 110 may then reorient itself based on such transmissions, e.g., by traveling to a selected position and rotating about a yaw axis, prior to or during a descent in order to complete a docking evolution based on the detected orientation of the docking station 160.

The bottom section of the frame 166 may further include one or more contacts (or connectors) 178 for providing services to the aerial vehicle 110 when the aerial vehicle 110 is docked within the docking station 160. For example, such contacts 178 enable electrical power, information or data to be conveyed between the aerial vehicle 110 and the docking station 160. Additionally, within an enclosure defined by the frame 166 and the housing 170, the docking station 160 may further include any number of fans or other equipment for reducing or raising a temperature of the docking station 160 or the aerial vehicle 110 when the aerial vehicle 110 is docked therewith, or maintaining the docking station 160 or such vehicles at any desired temperatures or in any other conditions.

The docking station 160 may have any dimensions in accordance with implementations of the present disclosure. For example, a height of the docking station 160 may be substantially smaller than a length or a width of the docking station 160. In some implementations, the docking station 160 may have lengths and widths of approximately twenty-five to thirty centimeters (25-30 cm), and a height of approximately five to ten centimeters (5-10 cm). In some other implementations, a height or depth of the depression 175 within the frame 166 may be selected on any basis. For example, a height or depth of the depression 175 may be selected based on lengths of landing extensions extending below housings of aerial vehicle 110$s$ that are intended to dock within the docking station 160.

Figure 1D:
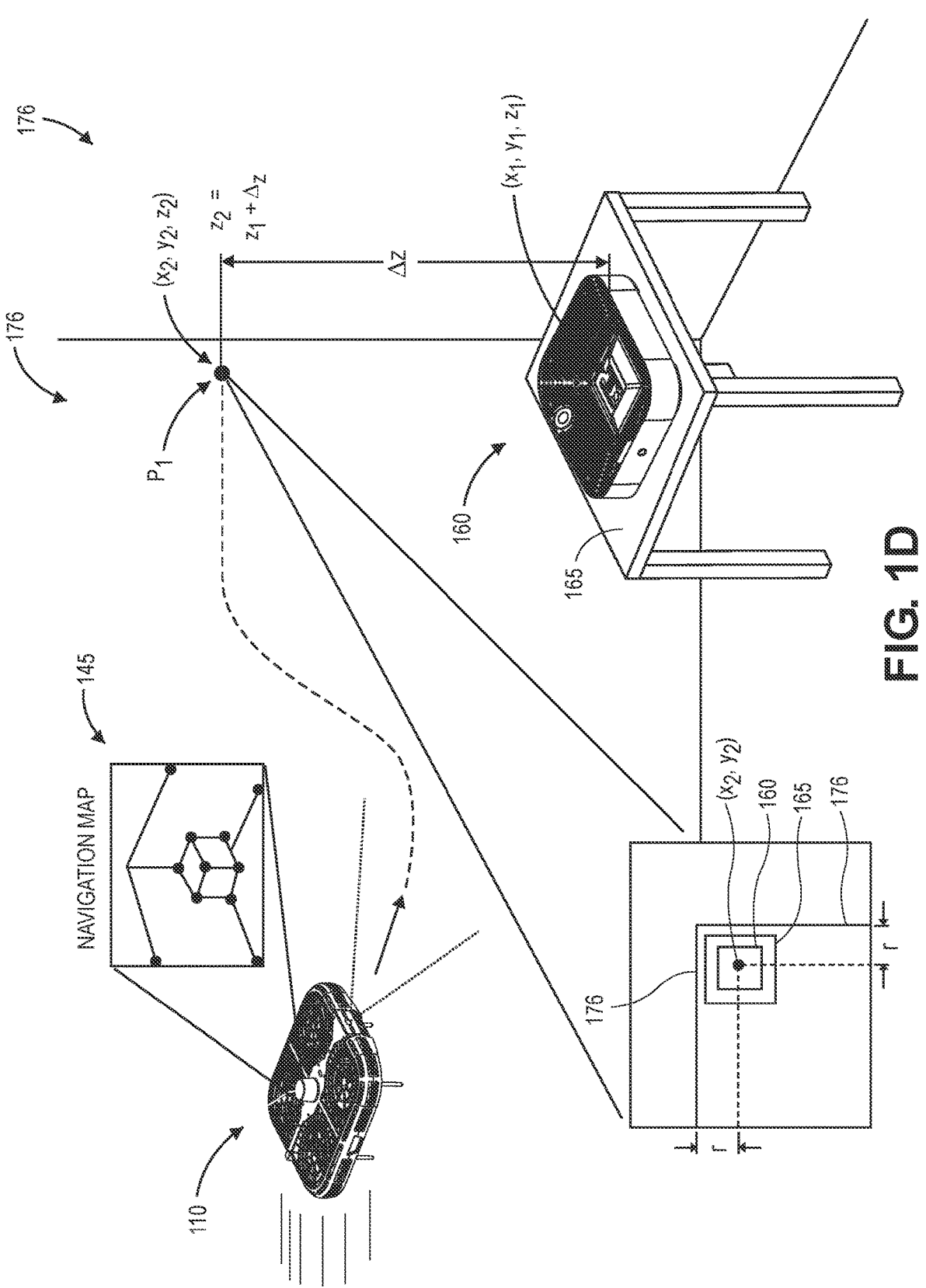

As is shown in FIG. 1D, after completing one or more missions, or after determining that a return to the docking station 160 is desired or required, the aerial vehicle 110 selects an initial position $P_1$ for completing a docking evolution at the docking station 160. The initial position $P_1$ for completing the docking evolution may be represented by a set of coordinates $(x_2, y_2, z_2)$ in three-dimensional space, which may be selected to enable the aerial vehicle 110 to safely begin the docking evolution at the docking station 160. For example, as is shown in FIG. 1D, the set of coordinates $(x_2, y_2)$ within a horizontal plane are selected based on the set of coordinates $(x_1, y_1, z_1)$ of the last known position of the docking station 160 within the horizontal plane, e.g., a position from which the aerial vehicle 110 took off, as is shown in FIG. 1A, subject to a minimum distance $r$ from positions of obstructions 176 (e.g., walls) within a vicinity of the docking station 160. For example, in some implementations, the set of coordinates $(x_2, y_2)$ may be identical to the set of coordinates $(x_1, y_1)$ where such coordinates are beyond the minimum distance r from the obstructions 175. Alternatively, where the set of coordinates $(x_1, y_1)$ are within the minimum distance r of one or more of the obstructions 175, the set of coordinates $(x_2, y_2)$ of the initial position $P_1$ may be selected to remain beyond the minimum distance r from one or more of the obstructions 175, e.g., by adjusting the set of coordinates $(x_1, y_1)$ accordingly.

Additionally, as is further shown in FIG. 1D, the initial position $P_1$ may have an altitude, or $z_2$, at a point that is selected at a minimum distance $\Delta z$ above the altitude $z_1$ of the last known position of the docking station 160. The minimum distance $\Delta z$ may have any value and may be selected on any basis. For example, in some implementations, the minimum distance $\Delta z$, or the altitude $z_2$, may be selected based on dimensions of a field of view of the camera 130-2.

After selecting the initial position $P_1$ for the docking evolution, the aerial vehicle 110 may execute one or more sets of instructions to calculate a trajectory for traveling to the initial position $P_1$, and operate one or more motors to cause the aerial vehicle 110 to travel along the trajectory toward the point $P_1$. The aerial vehicle 110 may determine its positions and orientations with respect to a navigation map 145 or the environment while traveling toward the point $P_1$ using data captured by one or more navigation sensors, e.g., a light detection and ranging ("LIDAR") sensor, a time-of-flight sensor, the camera 130-1, the inertial measurement unit 125, or any other sensors. For example, the aerial vehicle 110 may determine its positions and orientations with respect to the environment according to one or more simultaneous localization and mapping (or "SLAM") techniques, or by any other techniques.

Figure 1E:
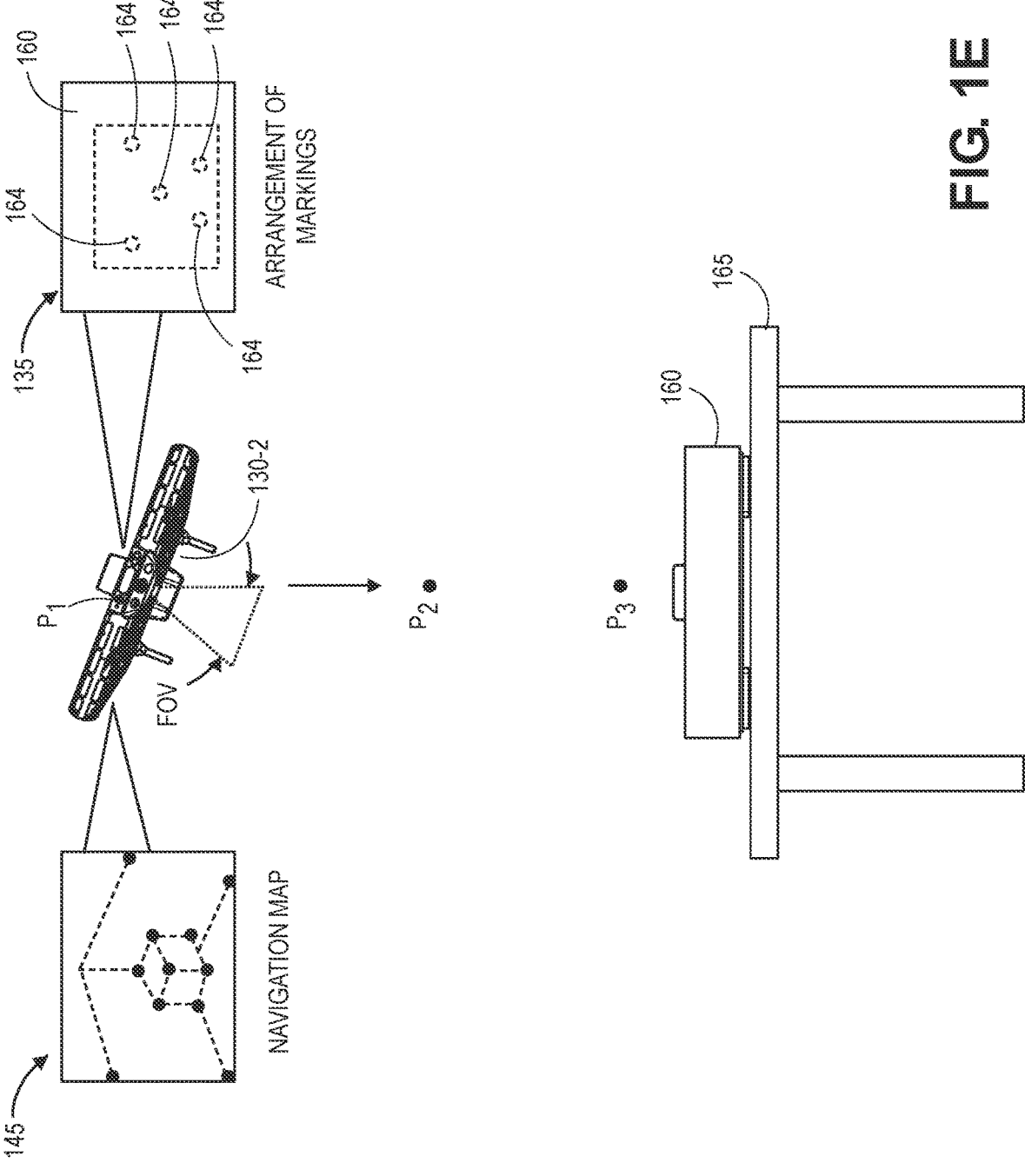

As is shown in FIG. 1E, the aerial vehicle 110 may be programmed with the navigation map 145, which may have been generated based on any data captured by any number of sensors, e.g., according to any SLAM techniques or any other techniques, and also programmed with data 135 representing an arrangement of the markings 164 within the docking station 160. The aerial vehicle 110 may initiate a docking evolution and begin a descent from the initial position $P_1$ toward a transition position $P_2$ and ultimately to a final position $P_3$, and may determine poses with respect to the navigation map 145, or an environment, e.g., a real-world environment, based on information or data captured by one or more navigation sensors as well as poses with respect to the docking station 160 based on imaging data captured using the camera 130-2. During a descent from the initial position $P_1$ toward the transition position $P_2$, the aerial vehicle 110 may also begin capturing images or other data using the camera 130-2, and process the images to determine a position and orientation of the aerial vehicle 110 with respect to the docking station 160.

Figure 1F:
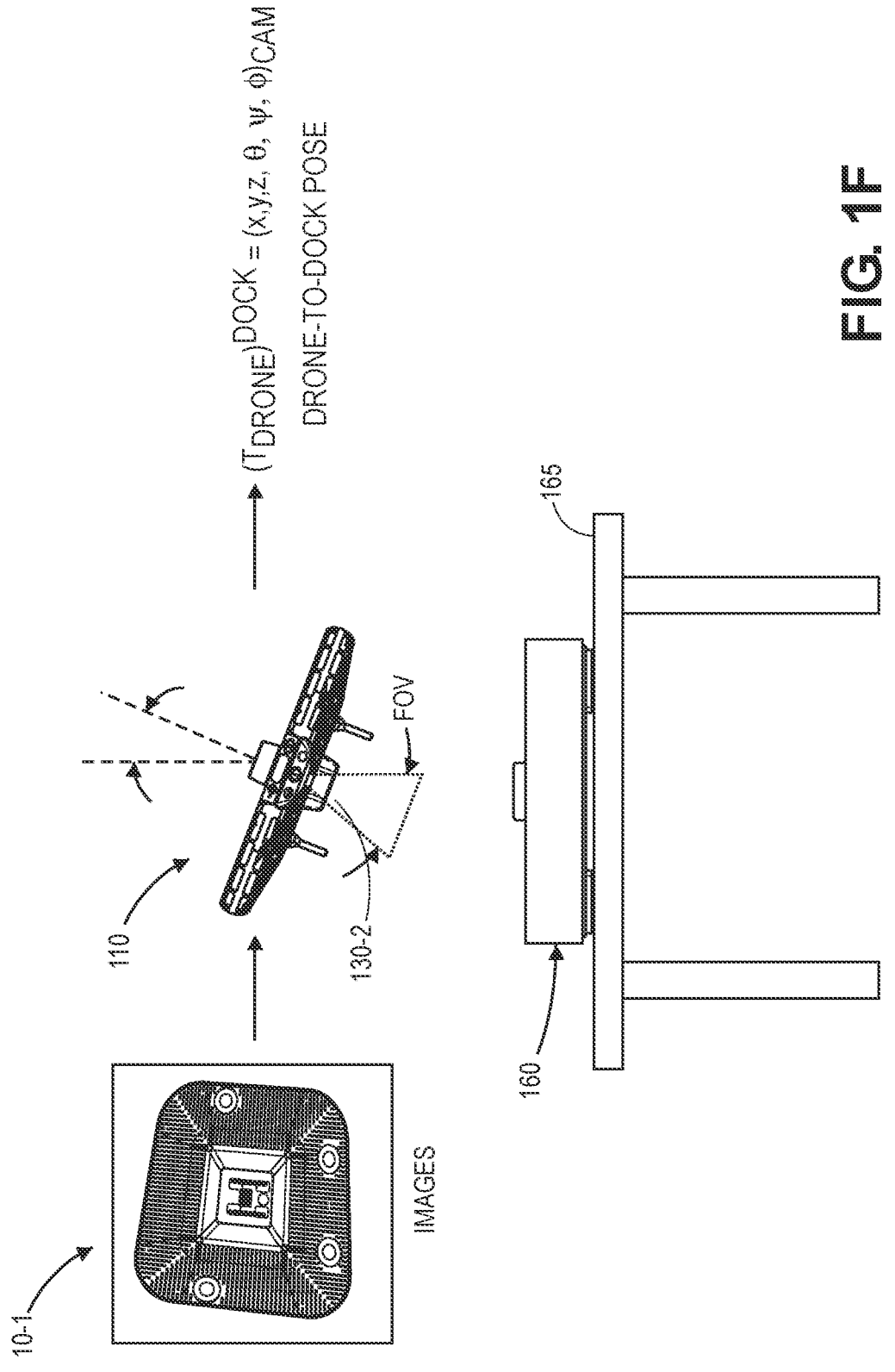

As is shown in FIG. 1F, the aerial vehicle 110 may determine a pose of the aerial vehicle 110 with respect to the docking station 160, or $(T_{DRONE})^{DOCK}$ (x, y, z, $\theta$, $\psi$, $\phi)_{CAM}$, using the camera 130-2, by detecting the markers 164 within images 10-1 captured by the camera 130-2 and transforming the images 10-1 as necessary.

In some implementations, the markers 164 may be detected within the images 10-1 and separated from background portions of the images 10-1 in any manner, such as by binarization, thresholding or segmentation. Subsequently, centroids of the detections may be reported as single point observations of the respective markers 164. Moreover, correspondence between detections of the markers 164 within the images 10-1 may be performed in any manner. For example, a center of a detection of a marker 164 within one of the images 10-1 may be projected onto a surface at the coordinates $(x_1, y_1)$ of the last known position of the docking station 160 at takeoff and within a horizontal plane, at a given altitude of zero. A nearest cluster of points corresponding to detections of the markers 164 that span around the last known position of the docking station 160 and having a size corresponding to the size of the pattern of the markers 164 as represented in the data 135 may be identified accordingly.

The pose $(T_{DRONE})^{DOCK}$ may include a position of the aerial vehicle 110 with respect to the docking station 160, e.g., coordinates along three axes, and an orientation of the aerial vehicle 110 with respect to the docking station 160, e.g., angles about the three axes, and may be determined in any manner based on detections of the markings 164 within images. For example, where a sufficient number of the markings 164 are present within a field of view of the camera 130-2, e.g., at least three, the pose $(T_{DRONE})^{DOCK}$ may be calculated according to a perspective-n-point algorithm, or in any other manner. When the aerial vehicle 110 is at substantially high altitudes above the docking station 160, the markings 164 may occupy only a small portion of a field of view of the camera 130-2. At low altitudes, however, the pose $(T_{DRONE})^{DOCK}$ may be affected by the field of view of the camera 130-2, and fewer than all (e.g., as few as one) of the markings 164 may be within a field of view of the camera 130-2.

Upon determining the pose $(T_{DRONE})^{DOCK}$ of the aerial vehicle 110 with respect to the docking station 160, the aerial vehicle 110 may execute one or more maneuvers, e.g., to reposition the aerial vehicle 110 along or about one or more axes, and cause the aerial vehicle 110 to be properly oriented with respect to the markers 164 and the frame 166.

Figure 1G:
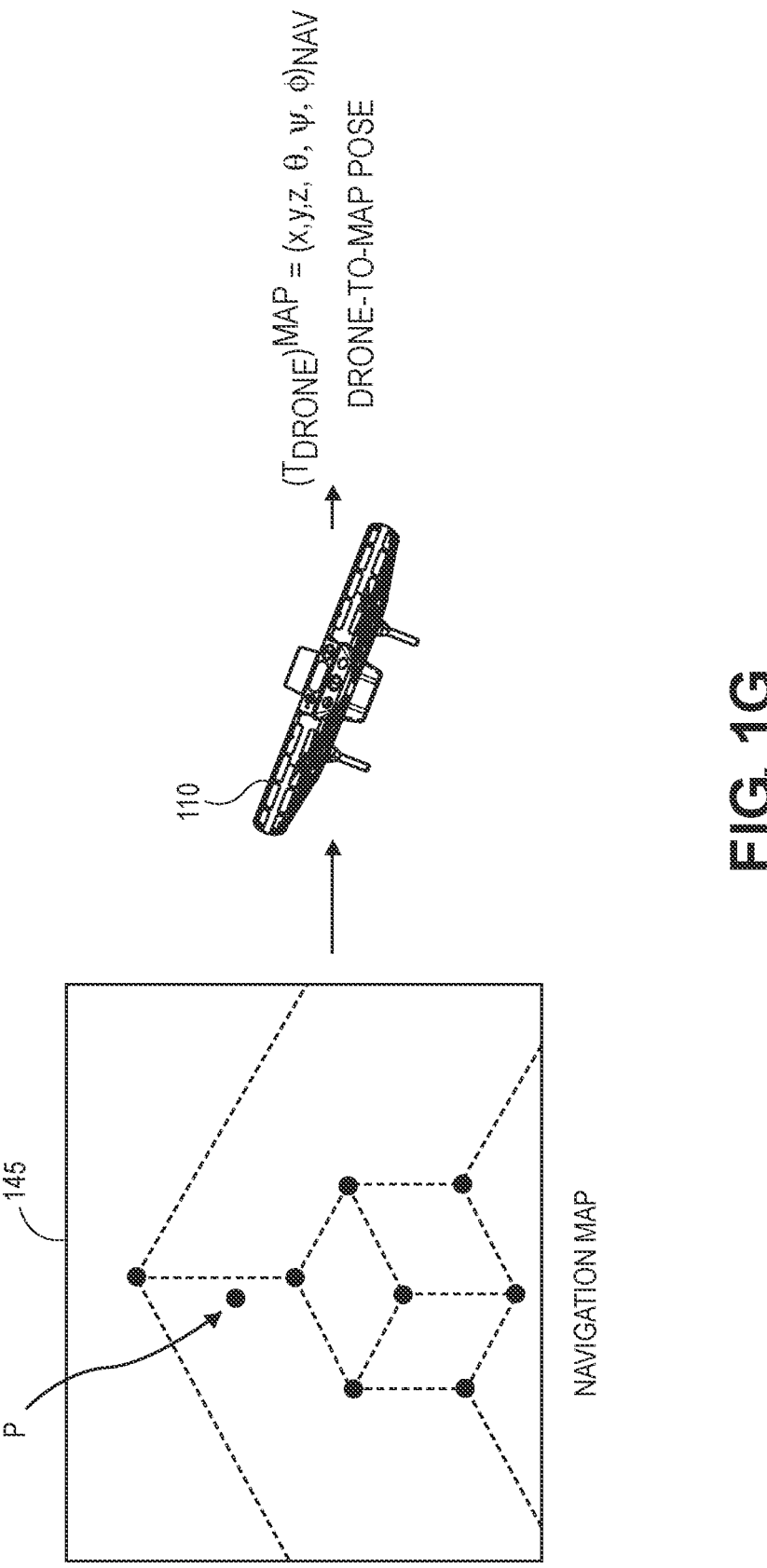

Similarly, as is shown in FIG. 1G, the aerial vehicle 110 may also determine a pose $(T_{DRONE})^{MAP}=(x, y, z, \theta, \psi, \phi)_{NAV}$ with respect to the navigation map 145 using data captured using one or more navigation sensors. The navigation map 145 is thus a reference frame that may be relied upon by the aerial vehicle to return to the docking station 160 and may be subject to one or more errors or local deformations, e.g., drift.

A pose of the docking station 160 at any given time t may be composed from a pose of the aerial vehicle 110 with respect to the docking station 160 at the time t, or $(T_{DRONE})^{DOCK}$ and a pose of the aerial vehicle 110 with respect to the navigation map 145 at the time t, or $(T_{DRONE})^{MAP}$, such that $(T_{DOCK})^{MAP}(t)=(T_{DRONE})^{MAP}(t)\cdot(T_{DOCK})^{DRONE}(t)=(T_{DRONE})^{MAP}(t)\cdot \text{inv}(T_{DRONE})^{DOCK}(t)$ according to matrix multiplication. As the aerial vehicle 110 descends from the initial position $P_1$ toward the transition position $P_2$, a new pose of the aerial vehicle 110 with respect to the navigation map 145, or $(T_{DRONE})^{MAP}(t)$, and a new pose of the aerial vehicle $(T_{DRONE})^{DOCK}(t)$ may be calculated for every frame of captured by the camera 130-2. Accordingly, a new pose of the docking station 160 with respect to the navigation map 145, or $(T_{DOCK})^{MAP}(t)$, may be calculated based each of the newly calculated poses $(T_{DRONE})^{MAP}(t)$, $(T_{DRONE})^{DOCK}(t)$, as well.

In some implementations, the aerial vehicle 110 may also determines an estimate of the pose of the docking station 160 with respect to the navigation map 145 at a time t, or $(T_{DOCK})^{MAP}(t)$, using previously calculated poses of the docking station 160 with respect to the navigation map 145, or $(T_{DOCK})^{MAP}(1 \ldots (t-1))$, which can be represented as $\text{Estimate}((T_{DOCK})^{MAP}, t-1)$.

In accordance with one or more implementations, whether estimates of the pose of the docking station 160 with respect to the navigation map 145 have converged may be determined by examining diagonal elements of a covariance matrix representing uncertainty of a current estimate of $(T_{DOCK})^{MAP}$. In particular, diagonal elements of a covariance matrix representing positions in three coordinates x, y, z and a yaw angle $\psi$ of the aerial vehicle 110, viz., Cov(x, x), Cov(y, y), Cov(z, z), Cov(y, y) elements may be evaluated to determine whether an estimate of the pose of the docking station 160 with respect to the navigation map 145 have converged, such as where each of such diagonal elements is below a predetermined threshold.

In accordance with some implementations, outliers may be detected by calculating distances, e.g., Mahalanobis distances, to determine whether an observation of a pose of the docking station 160 with respect to the navigation map 145 is an outlier. When an observation $(T_{DOCK})^{MAP}(t)$ is inconsistent with a current estimate given by $(T_{DOCK})^{MAP}(1 \ldots (t-1))$, the estimate is reset.

Specifically, in accordance with some implementations, an outlier detection algorithm may compute a Mahalanobis distance between an estimate of the pose of the docking station 160 with respect to the navigation map 145 up to a most recently captured image by the camera 130-2, and a current observation of the pose of the docking station 160 with respect to the navigation map 145. If a distance between the estimate of the pose of the docking station 160 with respect to the navigation map 145 determined from recently captured images is within a ninety-five percent range of a chi-squared cumulative distribution function over an extended period of time, the poses may be determined to have converged.

Relationships between estimates of the pose of the docking station 160 with respect to the navigation map 145 $(T_{DOCK})^{MAP}(t-1)$ and an observation of the pose of the docking station 160 with respect to the navigation map 145, e.g., in real time or near-real time, require data from navigation sensors and also the inertial measurement unit 125 over a duration between the time (t−1) and the time t. Moreover, if one or more navigation sensors of the aerial vehicle 110 includes a two-dimensional LIDAR sensor, for example, measurements of positions within a horizontal plane and yaw angles may drift over time as an altitude of the aerial vehicle 110 changes over time. In some implementations, drift of measurements may be modeled in order to obtain meaningful uncertainty estimates for relative motion of the aerial vehicle 110 between the time (t−1) and the time t.

In accordance with one or more implementations, the aerial vehicle 110 continuously updates the pose of the docking station 160 with respect to the navigation map 145, or $(T_{DOCK})^{MAP}$, as new observations of the poses of the aerial vehicle 110 with respect to the navigation map 145, or $(T_{DRONE})^{MAP}$, and the aerial vehicle 110 with respect to the docking station 160, or $(T_{DRONE})^{DOCK}$, are determined until convergence. In some implementations, convergence of the pose of the docking station 160 with respect to the navigation map 145, or $(T_{DOCK})^{MAP}$, is determined by uncertainty in a current estimate of the pose of the docking station 165 with respect to the navigation map 145, which decreases as more observations are calculated.

Figure 1H:
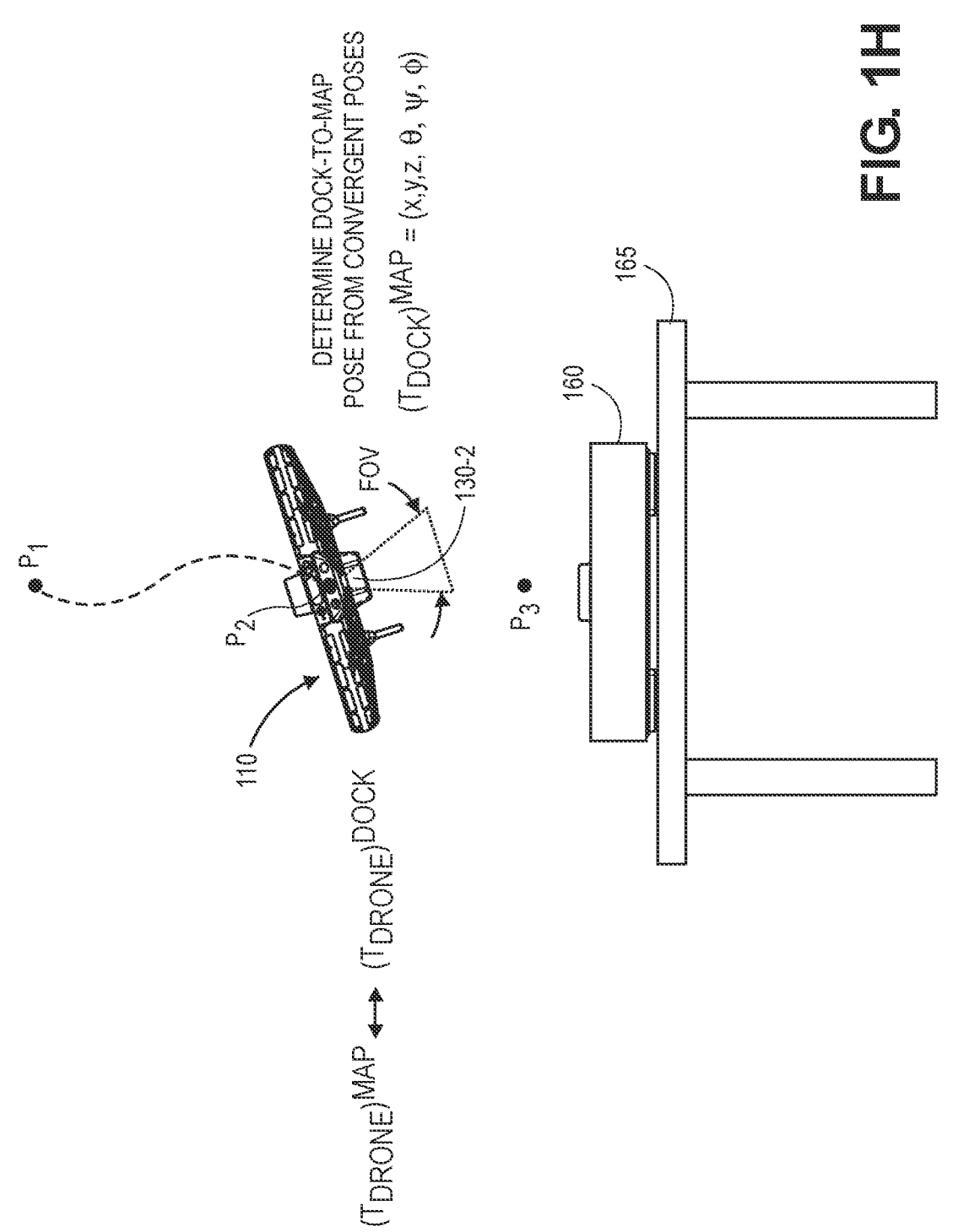
Figure 11:
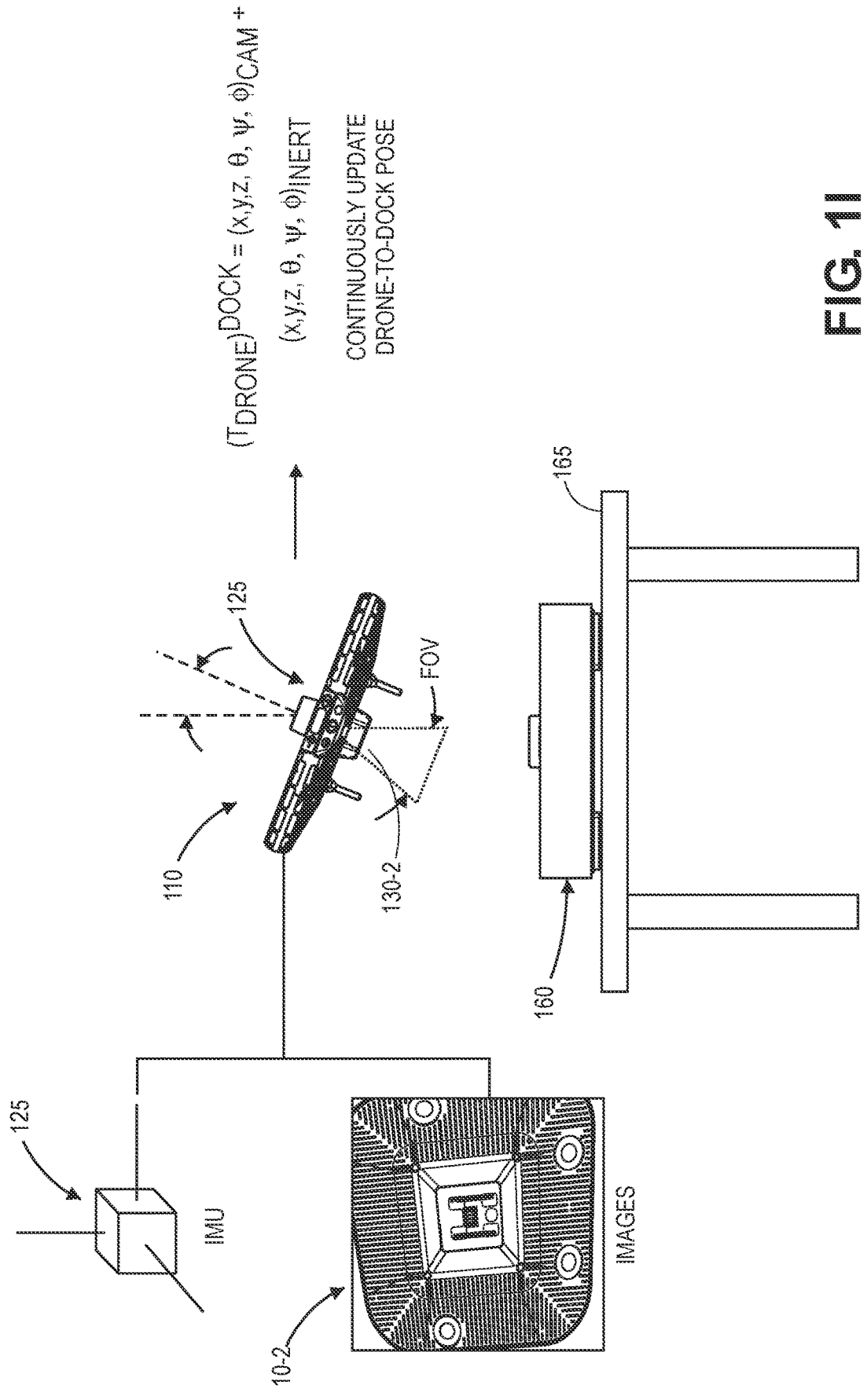

As is shown in FIG. 1H, if the pose $(T_{DRONE})^{DOCK}$ determined using the camera 130-2 converges with the pose $(T_{DRONE})^{MAP}$ determined using the navigation sensors and the navigation map 145, prior to a transition position, or P$_2$, the aerial vehicle 110 may determine a pose $(T_{DOCK})^{MAP}$ of the docking station 160 with respect to the navigation map 145 based on the pose $(T_{DRONE})^{DOCK}$ and the pose $(T_{DRONE})^{MAP}$. Upon determining that the pose $(T_{DRONE})^{DOCK}$ and the pose $(T_{DRONE})^{MAP}$ have converged, the aerial vehicle 110 may continue a descent to the docking station 160, and determine poses $(T_{DRONE})^{DOCK}$ of the aerial vehicle 110 with respect to the docking station 160 using the camera 130-2 and one or more inertial sensors, e.g., the inertial measurement unit 125. In accordance implementations of the present disclosure, a pose of the docking station 160 with respect to the navigation map 145 at a given time t, or $(T_{DOCK})^{MAP}(t)$, is relied upon in navigating the aerial vehicle 110 towards a position over the dock based on a current understanding of where the aerial vehicle 110 is located with respect to the navigation map 145, or an environment, and a current understanding of where the docking station 160 is located on the navigation map 145.

Whether the pose $(T_{DRONE})^{MAP}$ and the pose $(T_{DRONE})^{DOCK}$ have converged may be determined in any manner. For example, convergence of the pose $(T_{DRONE})^{MAP}$ and the pose $(T_{DRONE})^{DOCK}$ may be determined by computing distances between estimates of the pose $(T_{DRONE})^{MAP}$ determined over time to each of the successively determined estimates of the pose $(T_{DRONE})^{DOCK}$. Such distances may be a Mahalanobis distance or any other distance and may be calculated in any other manner. Where the distances are sufficiently small, or fall within a predetermined threshold of a cumulative distribution function, the pose $(T_{DRONE})^{MAP}$ and the pose $(T_{DRONE})^{DOCK}$ may be determined to have converged. Alternatively, or additionally, accuracy of the pose $(T_{DRONE})^{DOCK}$ of the aerial vehicle 110 with respect to the docking station 160 may be determined by computing distances between estimates of the pose $(T_{DRONE})^{DOCK}$ determined from images or sets of images that are consecutively captured by the camera 130-2.

As is shown in FIG. 1I, where the pose $(T_{DRONE})^{MAP}$ of the aerial vehicle 110 has been determined information or data captured using one or more navigation sensors, an updated pose $(T_{DOCK})^{MAP}$ of the docking station 160 with respect to the navigation map 145 may be calculated based on updated poses $(T_{DRONE})^{DOCK}$ determined from images 10-2 captured using the camera 130-2, as well as data received from the inertial measurement unit 125. The images 10-2 may be processed to detect the markers 164 depicted within the images 10-2, and to transform the images 10-2. Information or data regarding positions or orientations of the aerial vehicle 110 with respect to the docking station 160 calculated based on data generated by the inertial measurement unit 125, and information or data regarding positions or orientations of the aerial vehicle 110 with respect to the docking station 160 calculated based on detections of the markers 164 within the images 10-2 may be combined, fused or aggregated in any manner to determine or update the poses $(T_{DRONE})^{DOCK}$. Additionally, the updated poses $(T_{DRONE})^{DOCK}$ may be used, along with the pose $(T_{DRONE})^{MAP}$ of the aerial vehicle 110 with respect to the navigation map 145, to determine the pose $(T_{DOCK})^{MAP}$ of the docking station 160 with respect to the navigation map 145. Moreover, during the descent below the transition position, or P$_2$, the aerial vehicle 110 may continue to capture data using the one or more navigation sensors, and may update the pose $(T_{DRONE})^{MAP}$ of the aerial vehicle 110 with respect to the navigation map 145 accordingly.

In some implementations, the aerial vehicle 110 determines a pose of the docking station 160 with respect to the navigation map 145 at or above the transition position P$_2$, or pose $((T_{DOCK})^{MAP})^{P2}$. After the aerial vehicle 110 has descended below the transition position $P_2$, the aerial vehicle 110 continues to calculate poses of the docking station 160 with respect to the navigation map 145, in real time or near-real time, e.g., poses $((T_{DOCK})^{MAP})^{NOW}$. The aerial vehicle 110 may also calculate and track differences between poses of the docking station 160 with respect to the navigation map 145 calculated in real time or near-real time, and the pose of the docking station 160 with respect to the navigation map 145 at or above the transition position $P_2$, or differences between the poses $((T_{DOCK})^{MAP})^2$ and $((T_{DOCK})^{MAP})^{NOW}$. Moreover, deformation of the navigation map 145 between the transition position $P_2$ and a current position of the aerial vehicle 110 may also be observed, e.g., by matrix multiplication of the pose $((T_{DOCK})^{MAP})^{P2}$ and an inverse of the pose $((T_{DOCK})^{MAP})^{NOW}$. Additionally, below the transition position $P_2$, the aerial vehicle continues to update poses $((T_{DOCK})^{MAP})^{NOW}$ calculated at current positions of the docking station 160 with respect to the deformations in the navigation map 145.

Figure 1J:
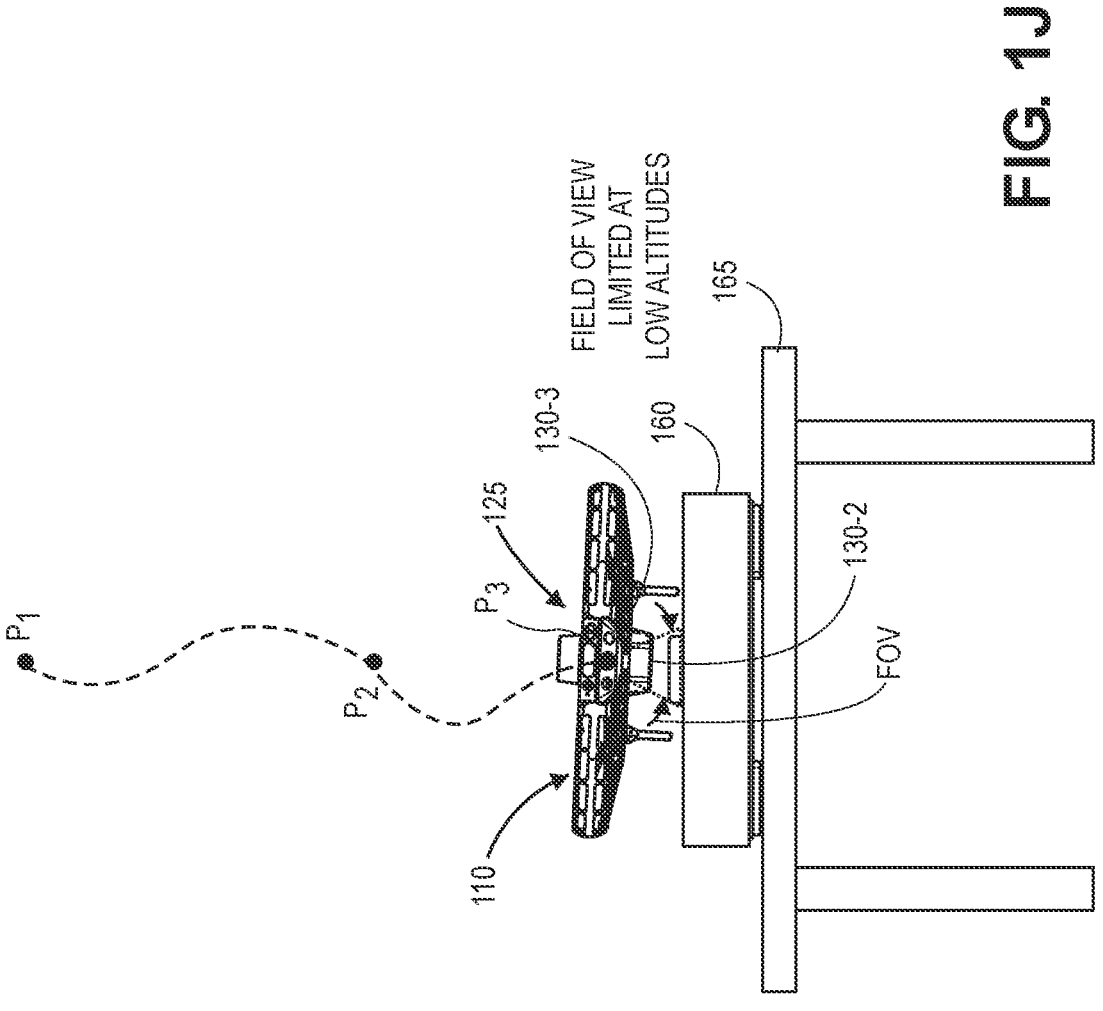

As is shown in FIG. 1J, when the aerial vehicle 110 reaches the final position $P_3$, that is sufficiently close to the docking station 160, the field of view of the camera 130-2 may be insufficiently wide to include all of the markers 164 within the docking station 160. The camera 130-2 may thus be unreliable or unsuitable to determine a pose of the aerial vehicle 110 with respect to the docking station 160. Therefore, the aerial vehicle 110 may continue a descent to the docking station 160, and transition to determining poses using one or more inertial sensors, and also the range sensor 130-3, which may be configured to calculate ranges to surfaces below the aerial vehicle 110 as the aerial vehicle 110 continues the descent from the final position $P_3$ to the docking station 160. Alternatively, or additionally, the aerial vehicle 110 may also continue to capture images using the camera 130-2, or capture data using the navigation sensors, and may utilize such images or data to update poses with respect to the docking station 160 or the navigation map 145, or any other coordinate system, to the extent that such images or data are reliable.

Figure 1K:
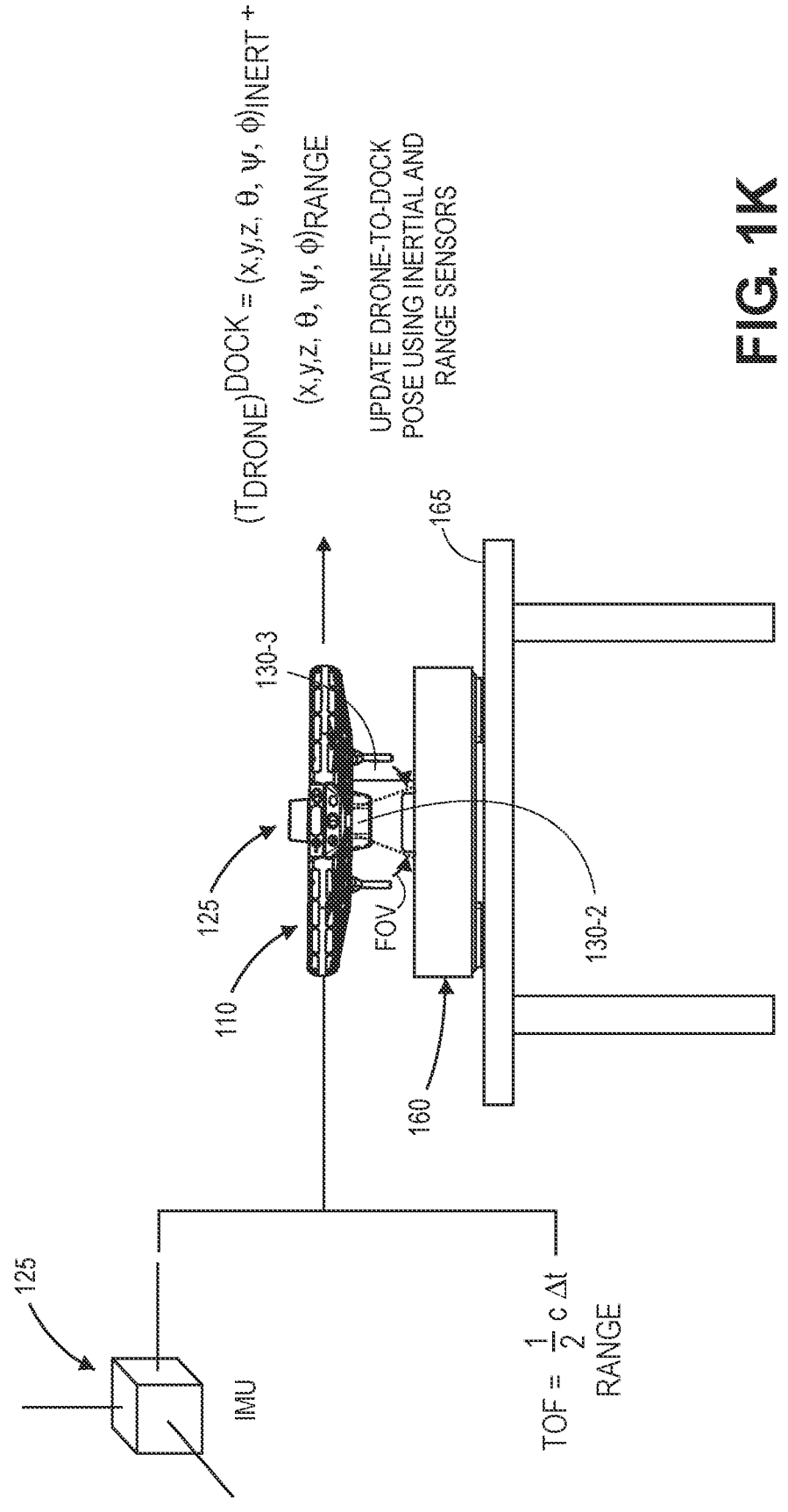

As is shown in FIG. 1K, the aerial vehicle 110 determines a pose $(T_{DRONE})^{DOCK}$ of the aerial vehicle 110 with respect to the docking station 160 based on data received from the inertial measurement unit 125, as well as ranges to surfaces of the docking station 160 determined by the range sensor 130-3. Such ranges may be calculated based on products of differences between times at which light is transmitted by the range sensor 130-3, and times at which reflections of the light are received by the range sensor 130-3, and the speed of light. The pose $(T_{DRONE})^{DOCK}$ may be determined by fusing poses determined based on data captured using the inertial sensors and poses determined using the range sensor 130-3 in any manner.

In some implementations, the aerial vehicle 110 need not update a pose of the docking station 160 with respect to the navigation map 145 in real time or near-real time when the aerial vehicle 160 is sufficiently close to the docking station 160. For example, where the aerial vehicle 110 may no longer calculate a pose $(T_{DRONE})^{DOCK}$ of the aerial vehicle 110 with respect to the docking station 160 based on images captured using the camera 130-2, data received from the inertial measurement unit 125, ranges to surfaces of the docking station 160 determined by the range sensor 130-3, or otherwise, the aerial vehicle 110 may assume negligible further deformation of the navigation map 145, and may instead rely on a most recently calculated pose of the docking station 160 with respect to the navigation map 145 $(T_{DOCK})^{MAP}$ in completing the docking evolution.

Figure 1L:
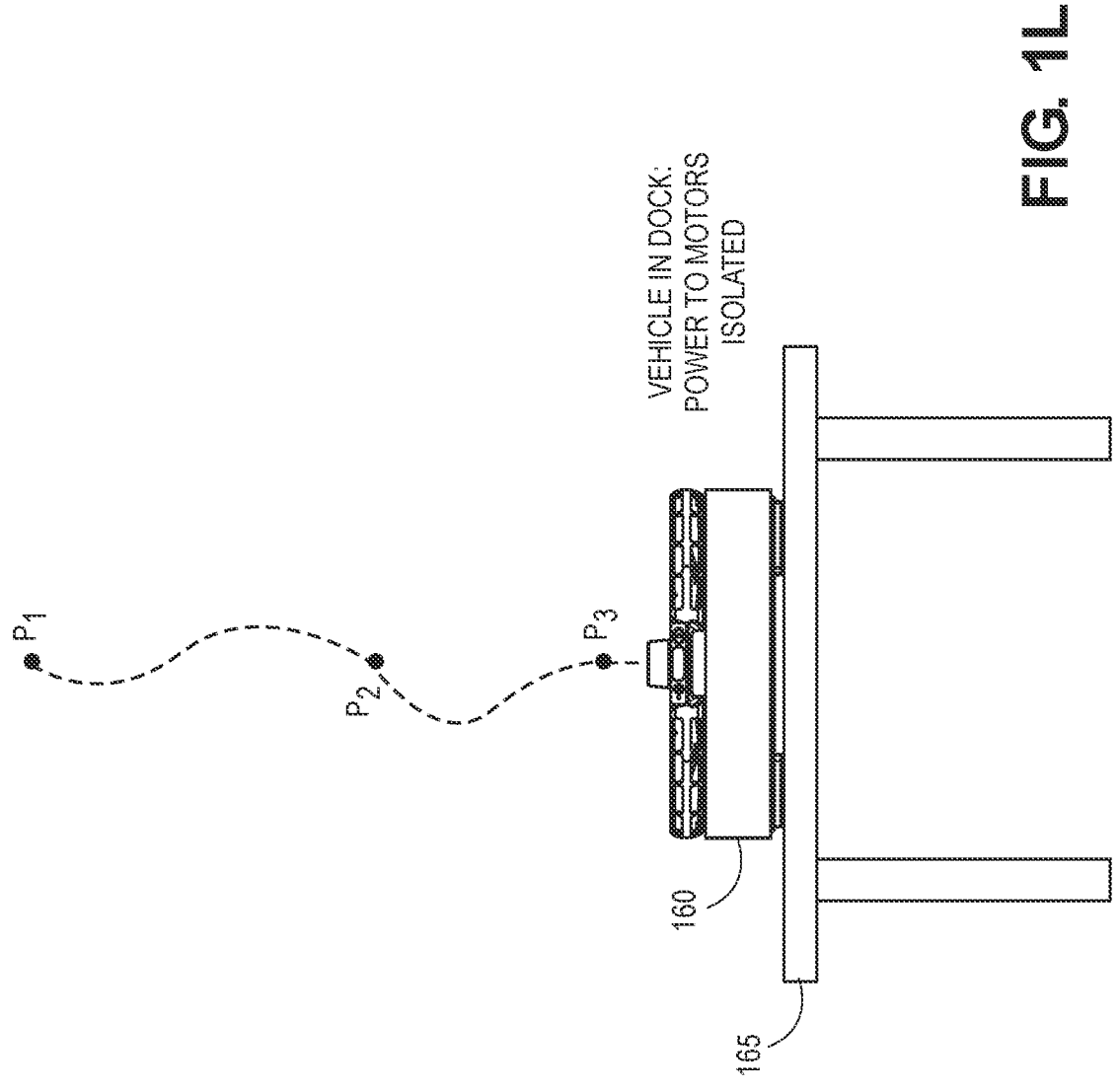

As is shown in FIG. 1L, upon confirming contact with the docking station 160, the aerial vehicle 110 may isolate power to propulsion motors, thereby causing the aerial vehicle 110 to descend into place within the depression 175, and to dock with the docking station 160 to complete the docking evolution. Contact with the docking station 160 may be determined based on any information or data, such as images captured by the camera 130-2, ranges determined by the range sensor 130-3, data generated by the inertial measurement unit 125, or in any other manner. Alternatively, power may be isolated to the propulsion motors, thereby causing the aerial vehicle 110 to descend, when the aerial vehicle 110 is at a sufficiently low altitude above the docking station 160 but prior to contacting the docking station 160.

Aerial vehicles of the present disclosure may be utilized or configured for any number or type of missions or operations. In some implementations, aerial vehicles of the present disclosure may be programmed or configured to generate one or more environment maps of indoor spaces within a facility, based on images or other data captured by one or more sensors. An environment map may identify or depict one or more boundaries (e.g., walls, ceilings, floors) or other aspects of indoor spaces, as well as the respective dimensions of such spaces, or the respective surfaces or textures of such boundaries. In some embodiments, an aerial vehicle may autonomously travel throughout an indoor space in order to capture data using one or more sensors, and such data may be utilized in generating an environment map of the indoor space. Additionally, an environment map generated based on data captured using one or more sensors of an aerial vehicle may further include one or more layers identifying locations of utilities, services or other systems within an indoor space.

Aerial vehicles of the present disclosure may be configured to operate any access-related systems within an indoor space, including any portals or other systems, or to enable communication with persons within an indoor space via one or more communications channels (e.g., voice, video and/or data). In some embodiments, an aerial vehicle may be programmed or instructed to automatically open a door or other entry point in a home, an office or another structure (e.g., a private dwelling or business location), to access a garage or other parking or standing area, or to activate an indication within an indoor space. For example, an aerial vehicle may be configured to transmit wireless codes, signals or other information to trigger a response from one or more devices or machines equipped with wireless transceivers, such as garage door openers, doorbells, lights, haptic feedback systems or other machines or devices. Aerial vehicles may also be configured to share any relevant information or data with persons, while preventing such persons from accessing any other sensitive information or data within the indoor space. Aerial vehicles may be further configured to communicate with any other vehicles or systems within an indoor space, including but not limited to cleaning robots, servicing robots, domestic robots, household robots, monitoring and/or surveillance robots, or robots of any other kind, e.g., to provide one or more instructions for performing one or more tasks within the indoor space.

In accordance with some embodiments of the present disclosure, an aerial vehicle may be configured to operate along with one or more docking stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

For example, in some embodiments, an aerial vehicle may also include one or more contacts (or connectors, e.g., charging contacts or charging connectors) that are positioned or aligned in an arrangement or pattern on an external surface of a portion of the aerial vehicle, e.g., a fuselage of the aerial vehicle, that is designed to contact corresponding portions of a docking station or another intermediary device. One or more internal surfaces of the docking station may include contacts (or connectors, e.g., charging contacts or charging connectors) that are positioned or aligned in an arrangement or pattern that is consistent with arrangements or patterns of contacts on external surfaces of an aerial vehicle, such that the contacts on the external surface of the portion of the aerial vehicle and the contacts on the one or more internal surfaces of the docking station mate or otherwise come into contact with one another when the portion of the aerial vehicle is in one of a plurality of predetermined alignments or orientations.

In some embodiments, an aerial vehicle may include one or more cameras or other optical sensors having fields of view that extend below the aerial vehicle and are aligned to capture imaging data while the aerial vehicle executes one or more landing evolutions. Thus, when the portion of the aerial vehicle attempts to land on a docking station or at another location, such cameras or other optical sensors may be used to guide the aerial vehicle onto the docking station or another landing surface.

Moreover, aerial vehicles of the present disclosure may be configured for use or operation within indoor spaces or facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks).

In some implementations, the aerial vehicles of the present disclosure may be dispatched or otherwise instructed to travel to one or more locations, to capture images or other data in such locations, and to determine whether a predetermined event or condition (e.g., an alarm event or condition) is occurring or has occurred at the one or more locations. In some embodiments, the aerial vehicles may be dispatched or instructed to travel to such locations directly, e.g., in response to one or more sets of instructions received from an external computer device over one or more networks.

The aerial vehicles of the present disclosure may take any action in response to determining that one or more sensors has detected a predetermined event or condition, or upon processing or otherwise analyzing data captured from one or more spaces within a facility. For example, an aerial vehicle may affirmatively determine, e.g., to various levels of confidence, that a predetermined event or condition has occurred in one or more spaces within a facility or, alternatively, that the predetermined event or condition has not occurred in such spaces. Alternatively, the aerial vehicles of the present disclosure may transmit images or other data captured from such spaces to one or more external computer devices or systems, such as a base component or other station configured to charge the aerial vehicles with electrical power (e.g., a base component, a charging dock, or another intermediary device or system) within the facility or, alternatively, to a server or other computer device or system provided in one or more alternate or virtual locations, e.g., in a "cloud"-based environment. The images or other data may be transmitted independently or along with one or more measures of a level of confidence (e.g., a confidence score) as to whether a predetermined event or condition has occurred or is present within the one or more spaces. Subsequently, the external computer device or system may make a determination, based on the images or other data, or any other data captured by one or more sensors present within such spaces or in any other location, whether a predetermined event or condition has occurred or is present within such spaces, or whether the predetermined event or condition has not occurred or is not present in such spaces.

Figure 2:
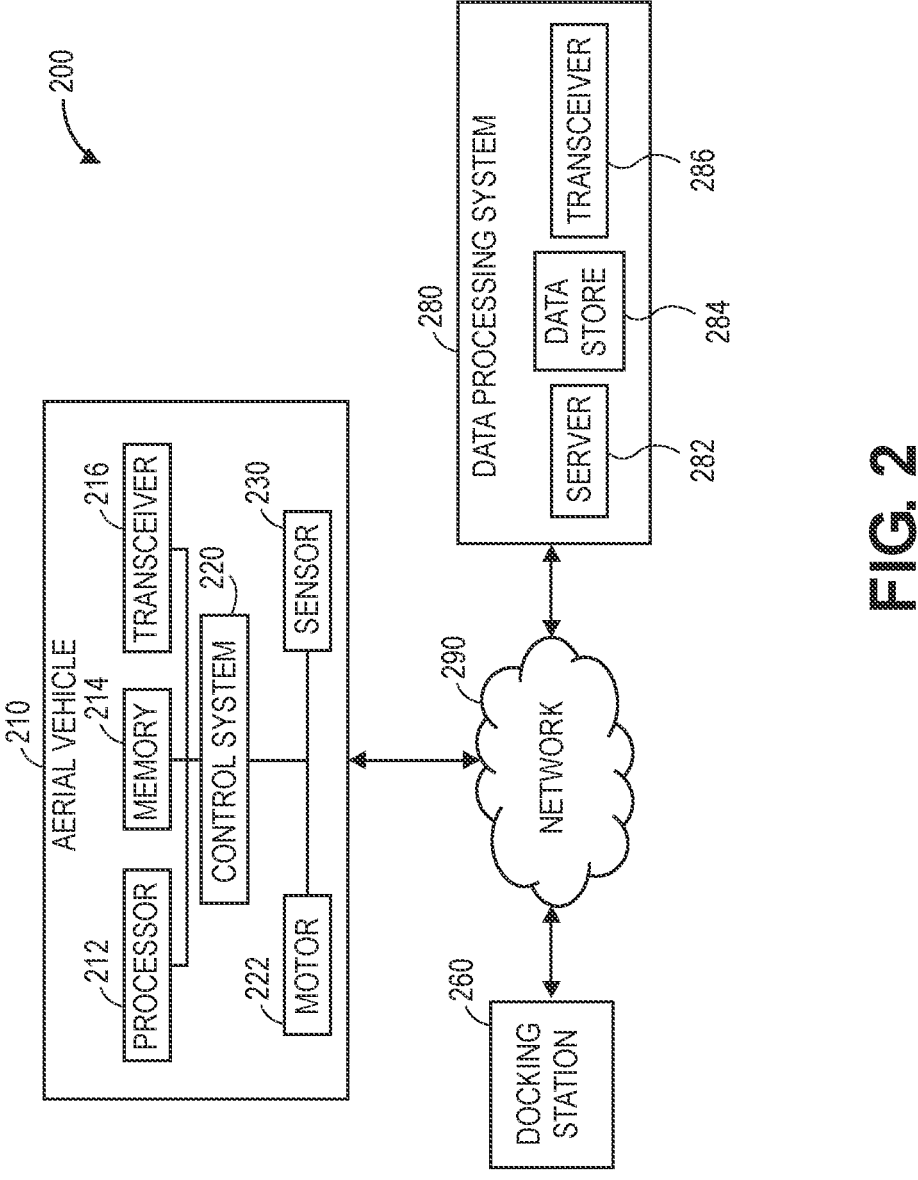
FIG. 2 is a block diagram of one system including an aerial vehicle in accordance with embodiments of the present disclosure.

Referring to FIG. 2, a block diagram of components of one system including an aerial vehicle in accordance with embodiments of the present disclosure is shown. The system 200 includes the aerial vehicle 210, a docking station 260 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1L.

The aerial vehicle 210 may be any type or form of aerial vehicle (e.g., an unmanned aerial vehicle, or drone) that may be programmed or configured to autonomously perform one or more operations within indoor spaces of a facility. As is shown in FIG. 2, the aerial vehicle 210 includes a processor 212, a memory 214 and a transceiver 216. The aerial vehicle 210 further includes a control system 220, one or more motors 222, and one or more sensors 230.

The processor 212 may be configured to perform any type or form of computing function associated with the operation of the aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the aerial vehicle 210. The processor 212 may be configured to control any aspects of the operation of the aerial vehicle 210 and any computer-based components thereon, including but not limited to the motors 222 or the sensors 230. For example, the processor 212 may control the operation of one or more control systems or modules, such as the control system 220, for generating instructions for conducting operations of one or more of the motors 222 or the sensors 230. Such control systems or modules may be associated with one or more other computing devices or machines, and may communicate with the docking station 260, the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), non-volatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 222 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (or "PCI") bus standard or the Universal Serial Bus (or "USB") standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system

220 may be configured to cause or control the operation of one or more of the motors 222, e.g., to cause one or more of the motors 222 to operate at desired speeds, in order to guide the aerial vehicle 210 along a desired course, at a desired speed, or at a desired altitude, as appropriate. The control system 220 may further control any other aspects of the aerial vehicle 210, including but not limited to the operation of one or more steering or braking systems of a aerial vehicle, or one or more control surfaces such as wings, rudders, flaperons, elevons, elevators, ailerons, flaps, brakes or slats of an aerial vehicle, within desired ranges. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide thrust and/or lift forces to the aerial vehicle 210 and any payload engaged thereby. In some embodiments, one or more of the motors 222 may be a brushless direct current ("DC") multiphase motor such as an outrunner brushless motor or an inrunner brushless motor.

The aerial vehicle 210 may include any number of such motors 222 of any kind. For example, one or more of the motors 222 may be aligned or configured to operate with different capacities or ratings, or at different speeds, or coupled to any number of propellers having different sizes and shapes. Additionally, one or more of the motors 222 may be an electric motor, e.g., a brushless DC multi-phase motor, and one or more of the motors 222 may be a gasoline-powered motor.

The aerial vehicle 210 may also include any number of sensors 230 or other components or other features for capturing data within a vicinity of the aerial vehicle 210, including but not limited to one or more imaging devices (e.g., cameras, such as visual cameras, depth cameras, infrared cameras, or others), range sensors (e.g., LIDAR sensors, time-of-flight sensors, ultrasonic sensors, or others), radiofrequency transceivers or receivers, Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions). For example, in some implementations, the aerial vehicle 210 may include two or more of such sensors 230 in an IMU or any other system. Furthermore, in some implementations, one or more of the sensors 230 may have fields of view or other orientations or configurations that enable the aerial vehicle 210 to capture information or data from below the aerial vehicle 210, or in any other direction with respect to the aerial vehicle 210. For example, in some implementations, the aerial vehicle 210 may include one or more cameras that are aligned to capture imaging data from fields of view extending below the aerial vehicle 210, and along or parallel to a yaw axis of the aerial vehicle 210. Alternatively, the aerial vehicle 210 may include one or more cameras that are aligned to capture imaging data from fields of view extending laterally with respect to the aerial vehicle 210, e.g., perpendicular to a yaw axis of the aerial vehicle 210, or along or parallel to a pitch axis or a roll axis of the aerial vehicle 210.

Although the block diagram of FIG. 2 includes a single box corresponding to a motor 222 and a single box corresponding to a sensor 230, those of ordinary skill in the pertinent arts will recognize that the aerial vehicle 210 may include any number of motors 222 or sensors 230 in accordance with the present disclosure.

The docking station 260 may be any device or system configured to receive portions of the aerial vehicle 210 therein or thereon, e.g., prior to or following operations of the aerial vehicle 210, and to support weight of the aerial vehicle 210, or provide power or connectivity to the aerial vehicle 210. The docking station 260 may include frames or housings formed from any suitable materials, as well as contacts (or connectors, e.g., charging contacts or charging connectors) for transferring power or data to or from the aerial vehicle 210. The docking station 260 may be formed from any suitable materials, and may have sizes, shapes or dimensions that are selected based on attributes or features of the aerial vehicle 210, in accordance with any of the implementations described herein.

In some implementations, the docking station 260 may include one or more transceivers or other components or systems for enabling communication between the aerial vehicle 210, the data processing system 280 or any other systems (not shown). Alternatively, in some other implementations, the docking station 260 need not include any such components or systems.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more vehicles, including but not limited to the aerial vehicle 210.

Each of the transceivers 216, 286 or other communications devices, systems or components may be configured to communicate through one or more wired or wireless means, e.g., wired technologies such as Universal Serial Bus (or "USB") or fiber optic cable, or wireless standards or protocols such as Bluetooth or any Wi-Fi protocol, over the network 290 or directly. The transceivers 216, 286 may further include or be in communication with one or more I/O interfaces, network interfaces or devices, and may be configured to allow information or data to be exchanged between one another, or to or from one or more other computer devices or systems via the network 290.

The transceivers 216, 286 may perform any necessary protocol, timing or other data transformations in order to convert data signals from a first format suitable for use by one component into a second format suitable for use by another component. For example, in some embodiments, the transceivers 216, 286 may be configured to communicate according to one or more protocols traditionally associated with discrete components, e.g., within specific frequency spectra, including but not limited to radio frequency signals typically within ranges of approximately three hundred to four hundred megahertz, or 300-400 MHz, as well as radio frequency signals typically within ranges of approximately three hundred to five hundred megahertz, or 300-500 MHz.

In some embodiments, the transceivers 216, 286 may be configured to transmit or receive Bluetooth signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth networks of 3 megabits per second (or 3 Mbps) or more, with a maximum transmission range of 10 to 100 meters or more, and at powers of approximately one milliwatt (mW), or 0.001 watts (W). The transceivers 216, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 286 may be configured to communicate within customized frequency spectra, or at dynamic frequencies, in accordance with the present disclosure. For example, in some embodiments, one or more of the transceivers 216, 286 may be configured to communicate according to a proprietary standard or protocol, or within a proprietary frequency spectrum.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the docking station 260 and/or data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the aerial vehicle 210, the docking station 260 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the aerial vehicle 210, the docking station 260 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
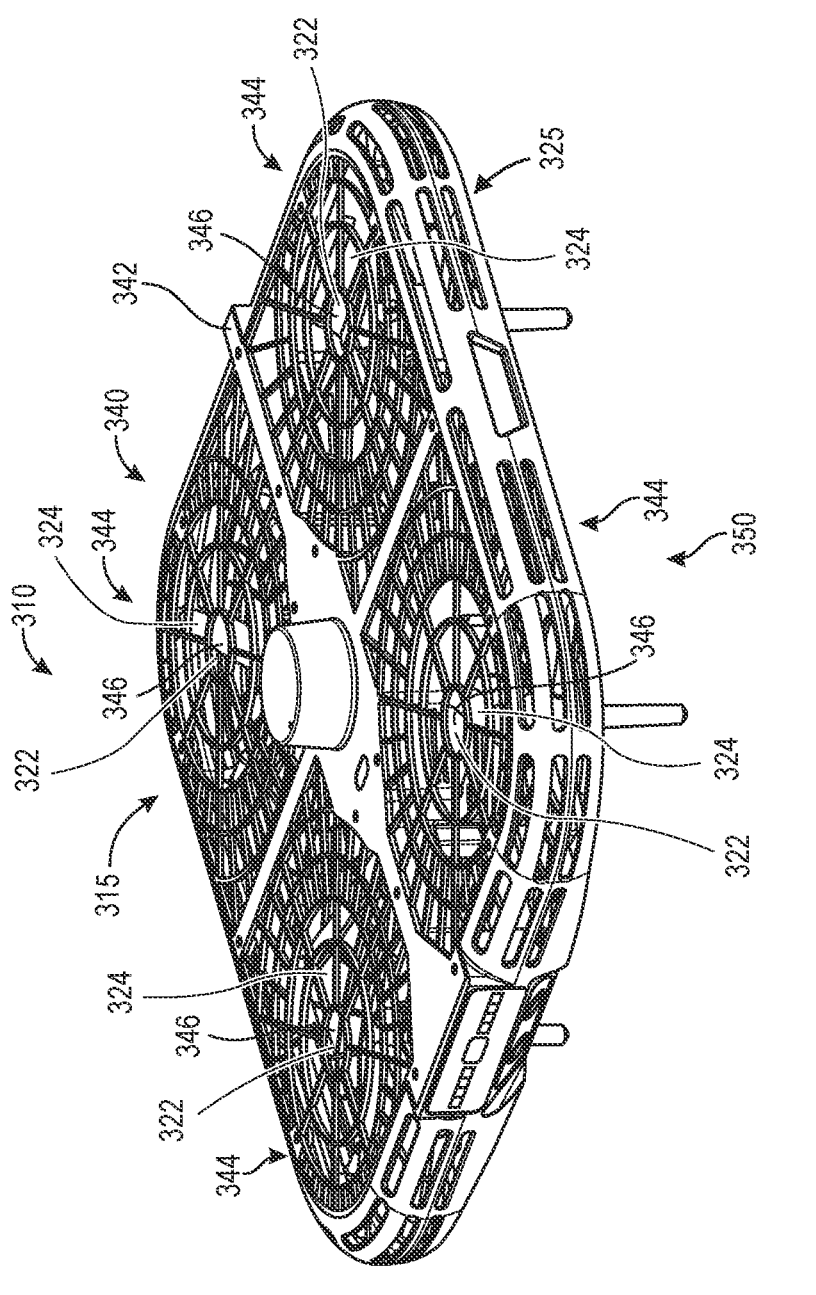
FIGS. 3A and 3B are views of aspects of one aerial vehicle in accordance with embodiments of the present disclosure.
Figure 3B:
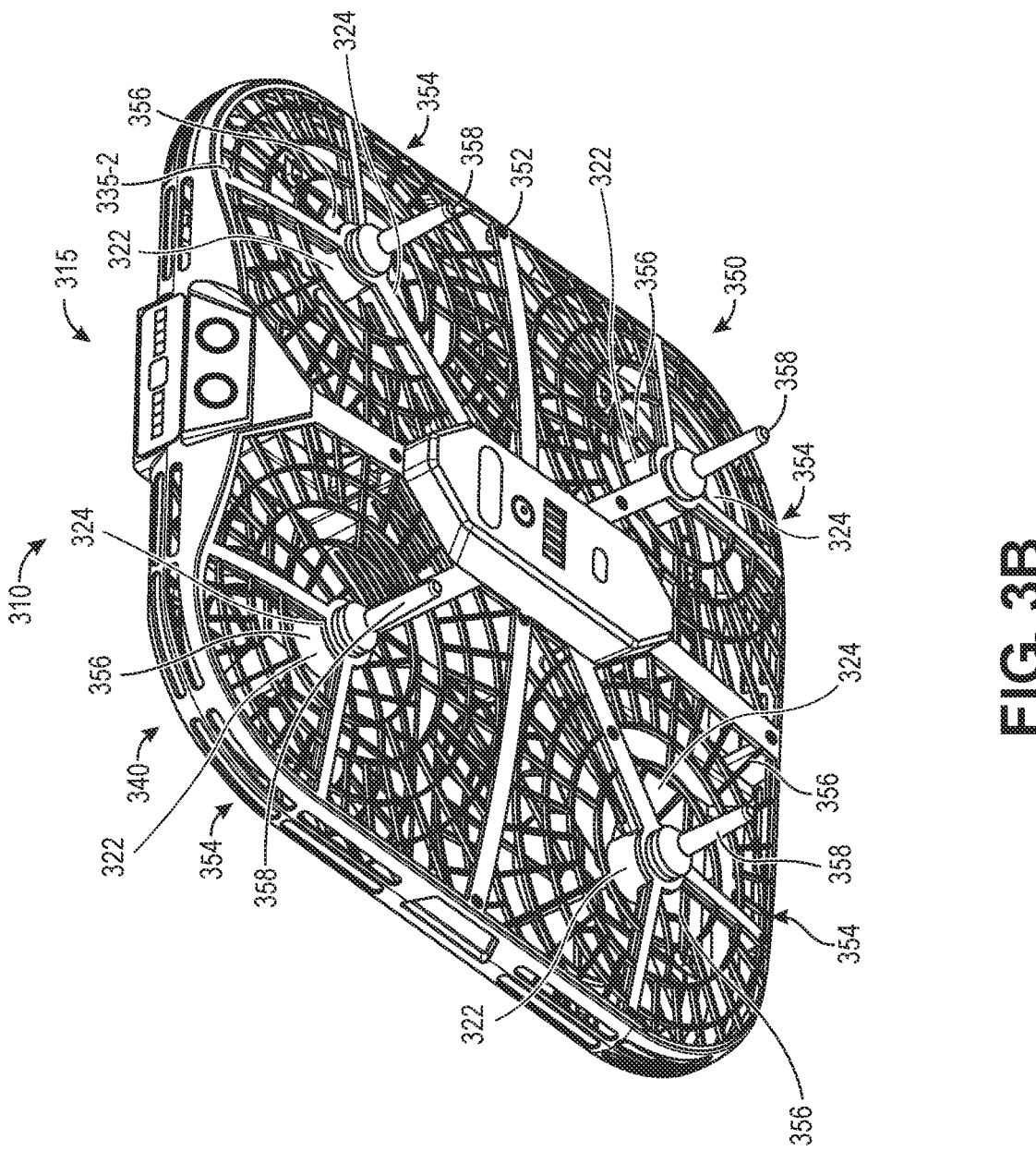

As is discussed above, housings of aerial vehicles of the present disclosure may be formed from sections having meshed or mesh-like constructions. Referring to FIGS. 3A and 3B, a view of an aerial vehicle in accordance with embodiments of the present disclosure is shown. Except where otherwise noted, reference numerals preceded by the number "3" shown in FIG. 3A or 3B refer to elements that are similar to elements having reference numerals preceded by the number "2" shown in FIG. 2 or by the number "1" shown in FIGS. 1A through 1L.

As is shown in FIGS. 3A and 3B, an aerial vehicle 310 includes a housing 315 formed from a shroud (or a side section) 325, an upper section 340, a lower section 350. As is shown in FIG. 3A, the upper section 340 includes an upper frame 342 and plurality of upper mesh sections 344. As is further shown in FIG. 3A, a representative one of the upper mesh sections 344 includes an inner ring defining a central opening 346 and a plurality of spokes extending radially outward from the central opening 346, as well as a plurality of other concentric rings having radii that are progressively larger than the central opening 346. The inner ring of the upper mesh section 344 defining the central opening 346, the spokes or the other concentric rings may have cross-sections of any other shape or size, e.g., squares, rectangles, circles or others, and may have any dimensions, such as widths or diameters of one to two millimeters (1-2 mm) each, and any lengths. Moreover, the central opening 346 and the other concentric rings may have any radii or diameters. For example, in some implementations, the central opening 346 may have a diameter of approximately one to two centimeters (1-2 cm), and the concentric rings may have progressively larger diameters, e.g., approximately nine to ten millimeters (9-10 mm) from the inner ring defining the central opening 346 or one another in a radial direction. The spokes of the upper mesh section 344 may have any angular separation from one another, e.g., forty-five degrees, or any fraction thereof, e.g., one-fourth of forty-five degrees.

As is shown in FIG. 3B, the lower section 350 also includes a lower frame 352, a plurality of lower mesh sections 354 (or lower meshes) mounted to the lower frame 352, and a plurality of landing pegs (or landing struts, or landing feet) 358. As is further shown in FIG. 3B, the lower mesh sections 354 may each be defined by a radially oriented lattice structure that includes a central opening 356 defined by an inner ring or another circular object. The lower mesh section 354 further includes a plurality of spokes extending radially outward from the central opening 356, as well as a plurality of other concentric rings having radii that are progressively larger than the central opening 356. The inner ring of the lower mesh section 354 defining the central opening 356, the spokes or the other concentric rings may have cross-sections of any other shape or size, e.g., squares, rectangles, circles or others, and may have any dimensions, such as widths or diameters of one to two millimeters each, and any lengths. Moreover, the central opening 356 and the other concentric rings may have any radii or diameters. For example, in some implementations, the central opening 356 may have a diameter of approximately two to four centimeters (2-4 cm), and the concentric rings may have progressively larger diameters, e.g., approximately nine to ten millimeters (9-10 mm) from the inner ring defining the central opening 356 or one another in a radial direction. The spokes of the lower mesh section 354 may have any angular separation from one another, e.g., forty-five degrees, or any fraction thereof, e.g., one-fourth of forty-five degrees.

As is shown in FIGS. 3A and 3B, the upper section 340 includes four upper mesh sections 344, each of which is provided above one of the propulsion motors 322. The lower section 350 includes four lower mesh sections 354, each of which is provided below one of the propulsion motors 322, and joined or otherwise mounted to the lower frame 352 or arms of a chamber to which the propulsion motors 322 are mounted. As is further shown in FIG. 3A, when the upper mesh sections 344 are mounted to the upper frame 342, the central openings 346 of each of the upper mesh sections 344 are coaxially aligned above one of the propulsion motors 322. As is further shown in FIG. 3B, when the lower mesh sections 354 are mounted to the lower frame 352, the central openings 356 of each of the lower mesh sections 354 are coaxially aligned below one of the propulsion motors 322.

As is shown in FIGS. 3A and 3B, the inner rings defining the central openings 356 of each of the lower mesh sections 354 have diameters that are substantially larger than the inner rings defining the central openings 346 of each of the upper mesh sections 344. For example, the central opening 356 may have a diameter of approximately two to four centimeters (2-4 cm), or approximately twice a diameter of the central openings 346, and the concentric rings of the lower mesh sections 354 may have progressively larger diameters. Likewise, the lower mesh sections 354 may include an increased number of spokes or concentric rings that are closer in proximity to one another at outer portions of such sections. In some implementations, one or more concentric rings of the lower mesh sections 354 may have the same dimensions as corresponding concentric rings of the upper mesh sections 344.

As is shown in FIG. 3A, the upper mesh section 344 includes the central opening 346 aligned with an axis of rotation of a motor 322 and a propeller 324, as well as a first set of openings arranged around the central opening 346, a second set of openings arranged around the first set of openings, and other sets of openings located radially beyond the second set of openings. As is shown in FIG. 3A, a first radial distance from the axis of rotation of the motor 322 and the propeller 324 to an inner edge of the central opening 346 is less than a second radial distance from an outer edge of the central opening 346 to an inner edge of the first set of openings, and the second radial distance is greater than both a third radial distance from an outer edge of the first set of openings to an inner edge of the second set of openings and the first radial distance.

As is shown in FIG. 3B, the lower mesh section 354 includes the central opening 356 aligned with the axis of rotation of the motor 322 and the propeller 324, as well as a third set of openings arranged around the central opening 356, a fourth set of openings arranged around the third set of openings, and other sets of openings located radially beyond the fourth set of openings. As is shown in FIG. 3B, a fourth radial distance from the axis of rotation of the motor 322 and the propeller 324 to an inner edge of the central opening 356 is greater than both a fifth radial distance from an outer edge of the central opening 356 to an inner edge of the third set of openings and a sixth radial distance from an outer edge of the third set of openings to an inner edge of the fourth set of openings.

The construction of the upper mesh sections 344 and the lower mesh sections 354 may result in improved operation of the motors 322 while enhancing the safety of the aerial vehicle 310. For example, distances between the central openings 346 of the upper mesh sections 344 or the central openings 356 of the lower mesh sections 354 and the concentric rings arranged around them, may be selected to facilitate airflow proximate the hubs of the propellers 324, as compared to airflow proximate to tips or outer edges of the propellers 324. In some implementations, the larger central openings 356 of the lower mesh sections 354 result in enhanced airflow distribution across propellers 324 near their respective hubs.

Further, in some implementations, a density of spokes and concentric rings at outer portions of the lower mesh sections 354 that are provided below tips of the propellers 324 may be greater than a density of spokes and concentric rings at outer portions of the upper mesh sections 344 that are provided above tips of the propellers 324. For example, a number of spokes between outermost concentric rings and next-outermost concentric rings of the lower mesh section 354 may be greater than not only a number of spokes between the inner ring defining the central opening 356 and a first concentric ring of the lower mesh section 354 but also greater than a number of spokes between outermost concentric rings and next-outermost concentric rings of the upper mesh section 344. The greater density of spokes and concentric rings at outer portions of the lower mesh sections 354 may inhibit the unwanted or unintended insertion of fingers or other body parts or objects into the housings 315 through such openings, thereby preventing damage to the motors 322 or the propellers 324, or reducing a risk of injury. Conversely, the distribution and spacing of the spokes and the concentric rings about the central openings 346 of the upper mesh sections 344 may be more regular and consistent throughout the respective upper mesh sections 344.

Moreover, the propellers 324 may be formed from a single-piece construction, and with rigid blades of fixed dimensions, or, alternatively, may have a foldable construction defined by one or more hinges, such that the propeller 324 may be folded into a reduced length or size when not rotating under power, and may be extended to a full length or size when operating under power. Furthermore, where the propeller 324 has a foldable construction, e.g., with blades having one or more hinges, in the event that an object contacts the propeller 324 during operation, the propeller 324 may deflect or fold in response to contact with the object. Such hinges may be provided at or near a hub of the propeller 324, or at any other location along the blades of the propeller 324.

The inner rings defining the central openings 346, 356, as well as the spokes and the concentric rings may have cross-sections of any shape or size, e.g., squares, rectangles, circles or others, and may have any dimensions, such as widths or diameters of one to one-and-one-half millimeters (1-1.5 mm) each, or any other dimensions, and any lengths. Moreover, the central openings 346, 356 and the other concentric rings may have any radii or diameters. Furthermore, the spaces between the respective spokes or concentric rings of the upper mesh sections 344 or the lower mesh sections 354 may be selected on any basis, such as economy, weight, safety or other factors.

As is further shown in FIG. 3B, the substantially slender construction of the landing pegs 358 serves to limit an extent to which the landing pegs 358 may inhibit airflow distribution across the propellers 324. For example, because proximal ends of each of the landing pegs 358 are mounted directly below one of the respective motors 322, e.g., to a support member of the lower frame 352, and because the landing pegs 358 neck or narrow from the proximal end to the distal ends of the landing pegs 358, the landing pegs 358 remain clear of areas through which air flows prior to entering the housing 315 through the respective lower mesh sections 354.

Figure 4A:
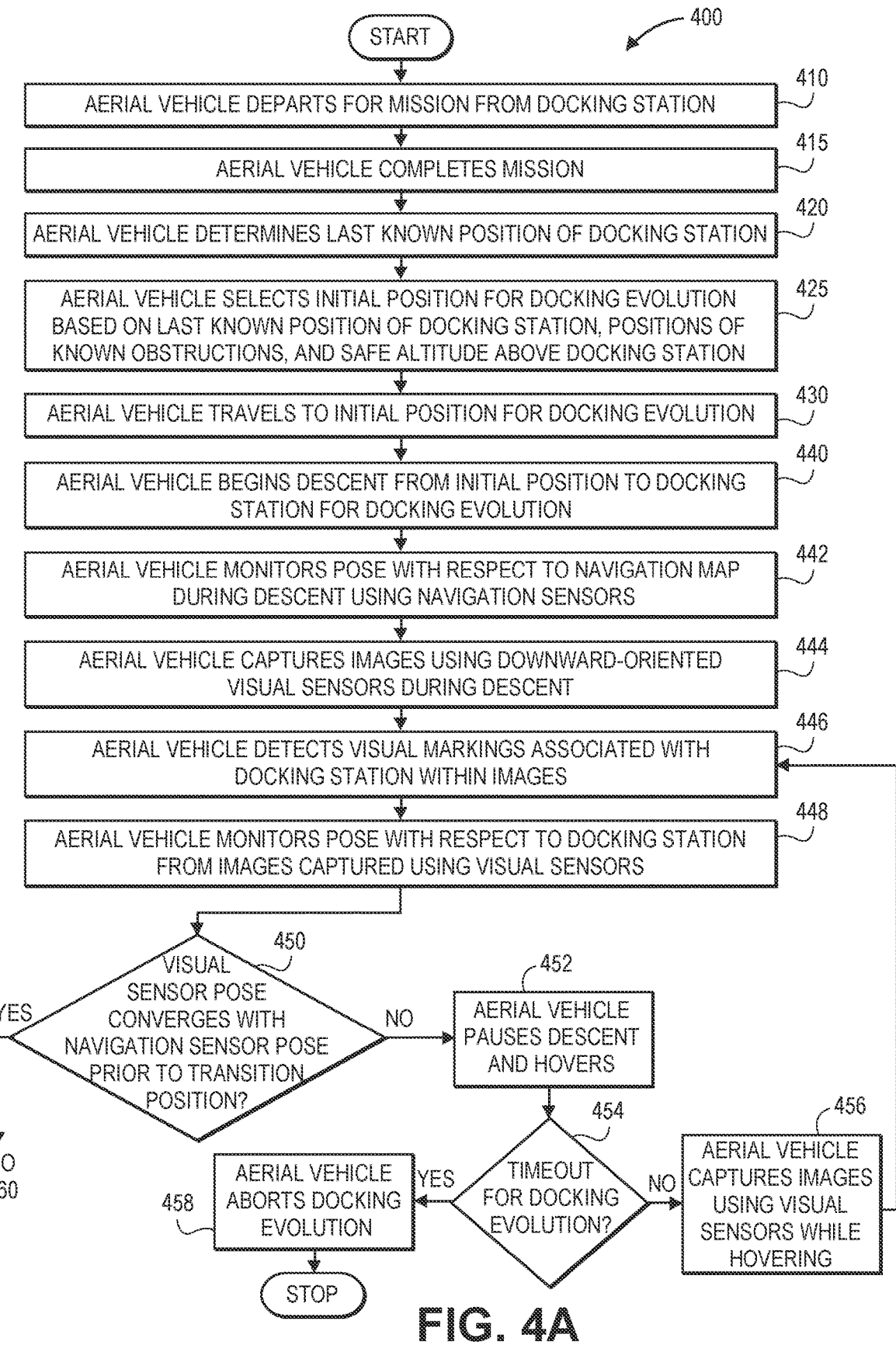
FIGS. 4A and 4B are a flow chart of one process to be performed by an aerial vehicle in accordance with embodiments of the present disclosure.
Figure 4B:
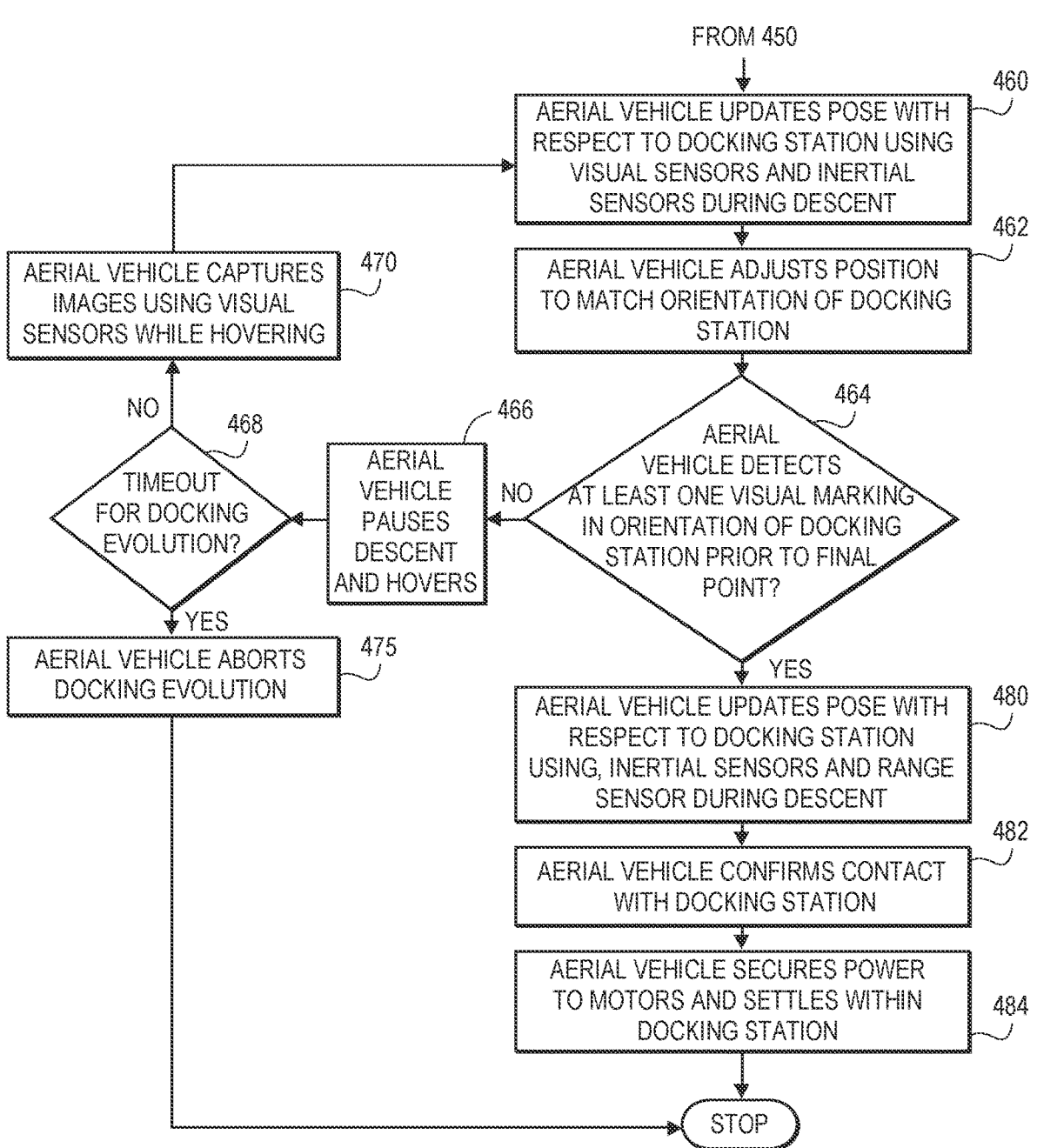

Referring to FIGS. 4A and 4B, a flow chart 400 of one process to be performed by an aerial vehicle in accordance with embodiments of the present disclosure is shown.

At box 410, an aerial vehicle departs from a docking station to perform a mission. For example, in some implementations, the aerial vehicle may be programmed or configured to evaluate one or more spaces within a facility, e.g., regularly or periodically, or at scheduled or random times. In some implementations, the aerial vehicle may be outfitted with one or more cameras or other sensors, and programmed or configured to travel throughout such spaces and capture not only images (e.g., visual images or depth images) but also information or data regarding emissions of energy by one or more components within such spaces, such as security system components (e.g., door or window sensors, motion detectors, smoke detectors, carbon monoxide or dioxide detectors, or the like), wireless communications systems (e.g., routers), computer devices (e.g., mobile devices or personal devices), electrical components or systems (e.g., outlets or conductors), or any other systems within such spaces.

In some implementations, the aerial vehicle may include a housing formed from any number of sections, as well as any number of motors, propellers or other systems within the housing that may be powered by electricity or any other fuel source or prime mover, and configured to generate forces of thrust and/or lift to the aerial vehicle and any payload engaged thereby. The aerial vehicle defines a substantially square cross-section, e.g., a substantially planar cross-section in the shape of a square with rounded corners or edges, or a squircle, with a substantially constant height, and a length and a width that are each substantially greater than the height. Alternatively, in some implementations, the housing of the aerial vehicle may have cross-sections of any other shape or size, e.g., rectangles other than squares, triangles, or any other polygons, or circles or any other curvilinear shapes, and may have any dimensions.

The aerial vehicle may also include any number of landing extensions or appurtenances extending below the aerial vehicle that enable the aerial vehicle to complete a landing evolution on any substantially flat surface. For example, the landing extensions may include pegs, feet or other portions that extend below a lowest point of the housing of the aerial vehicle, and are aligned in a common plane, such that the aerial vehicle may land on a substantially flat landing surface with each of the ends of the pegs in contact with the landing surface, and no other portion of the aerial vehicle in contact with the landing surface. In some implementations, the landing extensions or portions thereof (e.g., pegs, feet, or other portions), may be formed from any type of plastics, such as low-friction plastics, having desired properties of friction, e.g., nylons, polyethylenes such as polyethylene sulfide, polyethylene terephthalate or other thermoplastics, polyetheretherketones, polytetrafluoroethylenes, or others.

The docking station may be any system or unit for accommodating all or a portion of an aerial vehicle therein between one or more missions, and for enabling the aerial vehicle to take off therefrom to perform such missions, or to return thereto following the completion of such missions or for any other reason. In some implementations, the docking station may include a frame defining a depression or another cavity for accommodating portions of an aerial vehicle therein. The frame may include an upper edge, a bottom section having a shape corresponding to a shape of the aerial vehicle, e.g., a square, or a shape similar to that of a square (e.g., a rounded square, or squircle), as well as one or more angled edge sections having sloped surface descending down at angles from the upper edge to the bottom section.

The frame of the docking station may further include a plurality of receptacles (or recesses or other openings) that are sized and aligned to accommodate landing pegs, struts, landing feet or other appurtenances at ends of landing extensions of an aerial vehicle therein, as well as a plurality of markers (or markings) within the depression. Such markers may be visual in nature and may include any letter, symbol, icon or other indicator that may be detected within images captured by a camera of an aerial vehicle. In some implementations, one or more of the markers may be a source of light, such as a light-emitting diode, or "LED," that project visual light that may be detected by one or more cameras or optical sensors of an aerial vehicle. In some other implementations, one or more of the markers may be reflective in nature, e.g., retroreflective, such that the visibility of the markers may be enhanced by the projection of visual light thereon by an aerial vehicle or any other systems. Moreover, in some implementations, the markers may include or be replaced by transmitters of any type or form of energy, e.g., short-range wireless radiofrequency transmissions, that may be captured by one or more sensors configured to receive such energy and determine distances between such sensors and such transmitters, e.g., based on times of flight of such energy.

A housing of the docking station may include a substantially flat base and a plurality of walls extending normal to the base that define an upper rim that mates with or contacts the upper edge of the frame. The housing may further include a raised extension (or privacy cover or privacy member) extending from and above one of the walls of the housing that extends above the upper edge of the frame.

Flat surfaces of the frame may also include one or more contacts (or connectors, e.g., charging contacts or charging connectors) or other features for mating with corresponding contacts (or connectors) of an aerial vehicle, such as one or more contacts (or connectors, e.g., charging contacts or charging connectors) provided on an underside or other portion of the aerial vehicle that is inserted into or enters the cavity defined by the frame. The contacts enable electrical power, information or data to be conveyed between the aerial vehicle and the docking station. The housing may further include one or more openings to facilitate the carrying of the docking station by hand.

The plurality of receptacles may be provided at corners of the bottom section of the frame, and arranged in a shape of a square or another rectangle. Each of the plurality of receptacles may be provided within a channel defined by the bottom section of the frame, or at the intersection of two of such channels. The channels are arranged in the shape of a square or another rectangle about the bottom section of the frame.

The plurality of markers may include any number of markers that are provided at various locations on upper surfaces of the frame and in a discrete arrangement that is irregular or asymmetric with respect to one or more axes and is uniquely oriented with respect to a position and an orientation of the docking station. Thus, when an aerial vehicle attempts a docking evolution at the docking station, and one or more cameras or other imaging devices of the aerial vehicle captures an image of the frame of the docking station, the aerial vehicle may detect the markers at various locations on the upper surface of the frame. The aerial vehicle may then determine an orientation of the docking station from such markings, and may reorient itself with respect to the docking station as necessary, e.g., by traveling to a selected position and rotating about a yaw axis, prior to or during a descent in order to complete a docking evolution based on the detected orientation of the docking station. Alternatively, in some implementations, where the plurality of markers include one or more transmitters, and where the aerial vehicle includes one or more sensors or other receivers, the aerial vehicle may capture transmissions of the radiofrequency energy by such transmitters and determine distances to such transmitters from such transmissions. The aerial vehicle may then reorient itself based on such transmissions, e.g., by traveling to a selected position and rotating about a yaw axis, prior to or during a descent in order to complete a docking evolution based on the detected orientation of the docking station.

At box 415, the aerial vehicle completes the mission. For example, the aerial vehicle may be programmed with information or data regarding a set of standards or conditions that must be met or established before the mission may be determined to be complete, and the aerial vehicle may determine that such standards or conditions have been met or established. Alternatively, the aerial vehicle may be instructed to terminate the mission for any reason, e.g., in response to instructions received from one or more external computer devices or systems, or may autonomously terminate the mission.

At box 420, the aerial vehicle determines a last known position of the docking station. For example, the aerial vehicle may have been preprogrammed with the last known position of the docking station prior to taking off from the docking station at box 410. Alternatively, the aerial vehicle may determine and store its position prior to taking off at box 410. The last known position of the docking station may be determined in three-dimensional space according to any standard or coordinate system, and may be represented in global or local coordinates, e.g., Cartesian coordinates, or in any other manner. The position of the docking station may be referenced herein as "last known," as the docking station may have been inadvertently or intentionally relocated after the aerial vehicle took off therefrom to perform the mission at box 410, such as where the docking station is mobile in nature, or is otherwise not fixed in position.

At box 425, the aerial vehicle selects an initial position for a docking evolution based on the last known position of the docking station, positions of known obstructions, and a safe altitude above the docking station.

In some implementations, the position may be selected based on a last known position of the docking station, as well as any offsets or buffers between the docking station and any walls, structural features or other obstructions. For example, in some implementations, coordinates of the last known position of the docking station within a horizontal plane may be determined. The position of the docking station within the horizontal plane may be compared to positions of any known obstructions within a vicinity of that position, e.g., appliances, floor lighting, furniture, plants, walls, or other features. Where the position of the docking station is located within a threshold distance of one or more obstructions within a horizontal plane, the initial position may be selected by adjusting the position of the docking station subject to one or more buffers or safety margins with respect to the obstructions. Additionally, an altitude of the initial position may be selected on any basis, such as any operational characteristics or requirements of one or more sensors or other systems provided aboard the aerial vehicle, e.g., one or more cameras, inertial measurement unit components, or sensors. Alternatively, the altitude of the initial position may be selected to provide any margins or buffers above the docking station or below a ceiling or other aspect of a facility, a scene or an environment in which the aerial vehicle operates.

At box 430, an aerial vehicle travels to the initial position for the docking evolution. In order to travel to the initial position for the docking evolution, the aerial vehicle may engage in flight operations of any type or form, e.g., by operating one or more propulsion motors and causing the aerial vehicle to travel on one or more trajectories in order to arrive at the initial position. For example, the aerial vehicle may execute one or more sets of instructions to calculate a trajectory toward a point in three-dimensional space corresponding to the initial position for the docking evolution, and operate one or more propulsion motors to cause the aerial vehicle to travel along the trajectory toward that point. While traveling along the trajectory, the aerial vehicle may determine its positions and orientations using data captured by one or more navigation sensors, e.g., a LIDAR sensor, a time-of-flight sensor, an inertial measurement unit, an imaging device, or any other sensors. For example, the aerial vehicle may determine its positions and orientations according to one or more simultaneous localization and mapping (or "SLAM") techniques, or by any other techniques.

At box 440, the aerial vehicle begins a descent from the initial position to the docking station. For example, the aerial vehicle may operate one or more propulsion motors to reduce an amount of lift supplied to the aerial vehicle, thereby causing the aerial vehicle to reduce its altitude with respect to the docking station. The aerial vehicle may further conduct any additional desired operations to reorient or reposition the aerial vehicle along or about a yaw axis, a pitch axis or a roll axis during the descent, as necessary.

At box 442, the aerial vehicle monitors its pose with respect to the environment during the descent using one or more navigation sensors, e.g., a LIDAR sensor, a time-of-flight sensor, an inertial measurement unit, an imaging device, or any other sensors. In some implementations, the aerial vehicle may utilize any data captured by any number of sensors, e.g., according to any SLAM techniques or any other techniques, to determine a position and orientation of the aerial vehicle in 3D space. The position and the orientation of the aerial vehicle may be determined along or about any axes, or according to any coordinate system, e.g., a real-world coordinate system.

At box 444, the aerial vehicle captures images using one or more downward-oriented visual sensors during the descent. For example, the aerial vehicle may include any number of cameras or other sensors that are aligned to capture data along or parallel to a yaw axis of the aerial vehicle, and from fields of view extending below the aerial vehicle. Such cameras may include, but need not be limited to, one or more visual cameras or, alternatively, infrared cameras or any other type or form of imaging devices. Alternatively, the aerial vehicle may capture data from below the aerial vehicle using any type or form of sensor. For example, the aerial vehicle may include any number of radiofrequency receivers or transceivers that are configured or aligned to capture transmissions of radiofrequency signals originating from below the aerial vehicle, or from any other direction with respect to the aerial vehicle.

At box 446, the aerial vehicle detects one or more visual markings associated with the docking station within the images. One or more of the visual markings may be letter, symbol, icon or other indicator that may be detected within images captured by a camera of the aerial vehicle. Alternatively, one or more of the visual markings may be any sources of light, e.g., light-emitting diodes, or "LED," that may emit light to be detected within images captured by a camera of the aerial vehicle. One or more of the visual markings may also be a reflective surface or feature that may reflect light to be detected within images captured by a camera of the aerial vehicle.

The aerial vehicle may be programmed with information or data regarding a known orientation or arrangement of the visual markings within a depression, a cavity or another portion or surface of the docking station. The aerial vehicle may be further programmed with one or more sets of instructions for performing any number of detection or recognition algorithms or techniques on images captured by the visual sensors. For example, in some implementations, initial detections of the visual markings within an image may be separated from background features according to a simple binarization technique, e.g., thresholding, or segmentation. Subsequently, the visual markings may be determined to be located at centroids of sets of pixels corresponding to detected visual markings within the images.

Correspondence between detections of the visual markings within images may be performed in any manner, such as by projecting a center of a detection within one of the images onto a surface at coordinates of a last known position of a docking station at takeoff and within a horizontal plane, at a given altitude of zero. A nearest cluster of points corresponding to the visual markings that span around the last known position of the docking station and having a size corresponding to the size of the pattern of the markers may be identified accordingly.

Alternatively, the aerial vehicle may detect portions of a docking station from data captured using sensors of any other type or form. For example, where the aerial vehicle is equipped with radiofrequency receivers or transceivers that are configured or aligned to capture transmissions of radiofrequency signals originating from below the aerial vehicle, or from any other direction with respect to the aerial vehicle, and the docking station is equipped with transmitters or transceivers provided on discrete portions of the docking station that are configured to transmit radiofrequency signals therefrom, the aerial vehicle may capture signals transmitted by the docking station and determine distances to such portions based on such signals.

At box 448, the aerial vehicle monitors a pose with respect to the docking station during the descent based on the images captured using the visual sensors. Upon detecting the visual markings, the aerial vehicle may determine its position and orientation with respect to the docking station, and may further compare the position and orientation determined with respect to the docking station to the position and orientation determined at box 442 with respect to the environment. Alternatively, the aerial vehicle may determine a pose with respect to the docking station in any other manner based on data captured by sensors of the aerial vehicle. The pose of the aerial vehicle with respect to the docking station may be determined in any manner based on detections of the visual markers within images. For example, where a sufficient number of the visual markers are present within fields of view of the visual sensors, e.g., at least three, a pose of the aerial vehicle may be calculated according to a perspective-n-point algorithm, or in any other manner.

At box 450, whether the pose determined with respect to the docking station using visual sensors at box 448 corresponds to the pose determined with respect to the environment using navigation sensors at box 442 is determined. For example, whether the pose determined with respect to the docking station using visual sensors at box 448 has converged with the pose determined with respect to the environment using navigation sensors at box 442 may be determined in any manner. The poses determined with respect to the environment based on navigation maps and data captured using navigation sensors may be compared to updated poses determined with respect to the docking station from every image or set of images captured using the visual sensors, and convergence of the poses may be determined in any manner, such as by computing distances between estimates of such poses, e.g., a Mahalanobis distance or any other distance, in any manner. Where the distances are sufficiently small, or fall within a predetermined threshold, the poses may be determined to correspond with one another.

If the pose determined with respect to the docking station using the visual sensors does not correspond to the pose determined with respect to the environment using the navigation sensors, then the process advances to box 452, where the aerial vehicle pauses its descent and hovers. At box 454, whether a timeout for the docking evolution has been reached is determined while the aerial vehicle hovers. If a timeout has been reached, then the process advances to box 458, where the aerial vehicle aborts the docking evolution. For example, the aerial vehicle may ascend to the original position above the docking station and attempt another docking evolution. Alternatively, the aerial vehicle may travel to an alternate or different location and attempt to land on one or more surfaces there, or to complete a docking evolution at a different docking station.

If a timeout has not been reached, however, then the process advances to box 456, where the aerial vehicle continues to capture images using the visual sensors while hovering, before returning to box 446, where the aerial vehicle detects visual markings associated with the docking station within such images.

If the visual sensor pose determined at box 448, e.g., based on images captured while descending or hovering, matches the navigation sensor pose determined at box 442, then the process advances to box 460, where the aerial vehicle continues to descend toward the docking station, and updates its pose with respect to the docking station using information or data captured using the visual sensors and inertial sensors provided aboard the aerial vehicle during the descent. For example, the aerial vehicle may track its position during a descent according to one or more visual servoing or visual-inertial servoing techniques, based on images captured using downward-oriented visual sensors alone, or based on such images and signals generated by an inertial measurement unit provided aboard the aerial vehicle, and without reliance on any navigation sensors. The aerial vehicle may conduct any additional desired operations to reorient or reposition the aerial vehicle along or about a yaw axis, a pitch axis or a roll axis during the descent, as necessary.

The aerial vehicle may also determine a pose of the docking station with respect to the environment based on updated poses of the aerial vehicle with respect to the docking station, as determined using visual sensors and inertial sensors, and the pose of the aerial vehicle with respect to the environment, as determined based on data captured by one or more navigation sensors. In some implementations, the aerial vehicle may continue to update a navigation map, or its pose with respect to the environment, based on data captured by one or more navigation sensors. The aerial vehicle may also update the pose of the docking station with respect to the environment based on updated poses of the aerial vehicle with respect to the environment, as well.

At box 462, the aerial vehicle adjusts its position to match an orientation of the docking station during the descent. For example, where the aerial vehicle is programmed with information or data regarding the arrangement of the visual markings of the docking station, the aerial vehicle may detect such markings within images captured by the downward-oriented visual sensors, and determine the orientation of the arrangement of the visual markings within such images. The aerial vehicle may then execute any number of maneuvers to reposition the aerial vehicle about a yaw axis, or along or about any other axes, to cause the orientation or alignment of the aerial vehicle to coincide with an orientation or alignment of the docking station, as determined from the arrangement of the visual markings within the images.

At box 464, whether the aerial vehicle detects at least one visual marking of the docking station while in the orientation of the docking station prior to reaching a final point is determined. For example, the aerial vehicle may be programmed with coordinates representing a final point in space by a distance above the docking station, which may represent an altitude below which the field of view of the camera may be limited, or may include fewer than all of the visual markings of the docking station. Therefore, the aerial vehicle may be programmed to determine that the aerial vehicle is in a proper orientation with respect to the docking station, and has detected at least one of the visual markings therein, prior to descending below the final point.

If the aerial vehicle has not detected at least one visual marking of the docking station prior to reaching the final point, or if the aerial vehicle is not in a proper orientation with respect to the docking station prior to reaching the final point, the process advances to box 466, where the aerial vehicle pauses its descent and hovers.

At box 468, whether a timeout for the docking evolution has been reached is determined, e.g., while the aerial vehicle hovers. If a timeout has been reached, then the process advances to box 475, where the aerial vehicle aborts the docking evolution. For example, the aerial vehicle may ascend to the initial position above the docking station and attempt another docking evolution, or to travel to an alternate or different location and attempt to land on one or more surfaces there. Alternatively, the aerial vehicle may travel to an initial position associated with another docking station, and attempt to complete a docking evolution at that docking station.

If a timeout has not been reached, however, then the process advances to box 470, where the aerial vehicle continues to capture images using the visual sensors while hovering, before returning to box 460, where the aerial vehicle attempts to continue its descent and determine its pose with respect to the docking station using the visual sensors an inertial sensors, and to box 462, where the aerial vehicle adjusts its position to match the orientation of the docking station, as necessary, before determining whether the aerial vehicle has detected at least one visual marking while in the orientation of the docking station prior to the final point.

If the aerial vehicle detects at least one visual marking of the docking station prior to reaching the final point, and is in the orientation of the docking station prior to reaching the final point, the process advances to box 480, where the aerial vehicle continues its descent and updates its pose with respect to the docking station using the inertial sensors and a range sensor. The range sensor may be a time-of-flight sensor or any other range sensor that is configured to determine ranges to surfaces below the aerial vehicle. The pose of the aerial vehicle with respect to the docking station may be determined by fusing poses determined using the inertial sensors and poses determined based on range data captured by the range sensor in any manner.

At box 482, the aerial vehicle confirms contact with the docking station. Contact with the docking station may be determined based on any information or data, such as images captured by the downward-oriented visual sensors, ranges determined by the range sensor, data generated by inertial sensors (e.g., changes in accelerations resulting from contact), or in any other manner.

At box 484, after confirming that it has contacted the docking station, the aerial vehicle secures power to its motors and settles within the docking station, and the process ends. Alternatively, power to the propulsion motors may be secured when the aerial vehicle is at a sufficiently low altitude above the docking station, thereby causing the aerial vehicle to descend and to contact the docking station.

Figure 5:
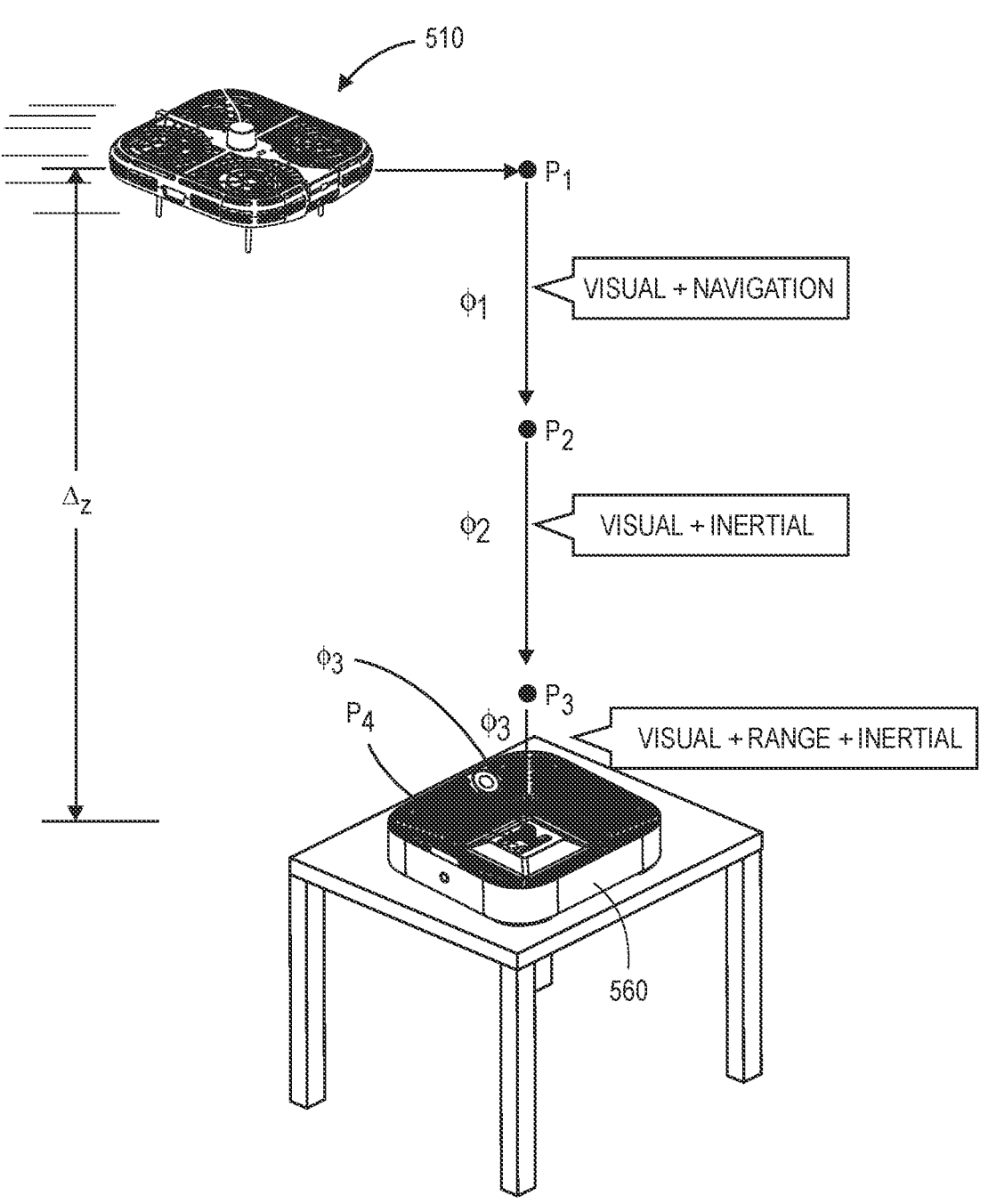
FIG. 5 is a view of aspects of one system in accordance with implementations of the present disclosure.

As is discussed above, a docking evolution may be conducted in multiple phases, and may rely on data captured by different sensors during each of such phases. Referring to FIG. 5, views of aspects of one system in accordance with embodiments of the present disclosure is shown. Except where otherwise noted, reference numerals preceded by the number "5" shown in FIG. 5 refer to elements that are similar to elements having reference numerals preceded by the number "3" shown in FIG. 3A or 3B, by the number "2" shown in FIG. 2 or by the number "1" shown in FIGS. 1A through 1L.

As is shown in FIG. 5, an aerial vehicle 510 may initiate a docking evolution at a docking station 560 by traveling to an initial position $P_1$ that is selected based on a last known position of the docking station 560, which may have been determined at a time when the aerial vehicle 510 departed from the docking station 560, or at any other time. The aerial vehicle 510 may travel to the initial position $P_1$ based on data captured by any number of navigation sensors, e.g., LIDAR sensors, time-of-flight sensors, imaging devices, or others. The aerial vehicle 510 may interpret the data to cause the aerial vehicle to travel along or in a manner consistent with navigation maps that were generated during prior operations of the aerial vehicle or at any other time based on the data.

In some implementations, where the docking station 560 is portable in nature, the docking station 560 may have moved between a time at which the aerial vehicle 510 last departed from the docking station 560, or at time at which the last known position of the docking station 560 was determined.

In some implementations, the initial position $P_1$ may have horizontal coordinates that correspond to the last known horizontal coordinates of the docking station 560. In some other implantations, however, the initial position $P_1$ may have horizontal coordinates that are determined with respect to positions of any obstructions within an environment or scene, and may be set off at a distance from the positions of such obstructions by a horizontal buffer or margin. Additionally, the initial position $P_1$ may have vertical coordinates that correspond to the last known altitude of the docking station 560, plus a vertical margin or buffer above the docking station or below a ceiling or other aspect of a facility, a scene or an environment in which the aerial vehicle operates. The altitude of the initial position $P_1$ may be selected on any basis, such as any operational characteristics or requirements of one or more sensors or other systems provided aboard the aerial vehicle 510.

Upon arriving at the initial position $P_1$, the aerial vehicle 510 may begin an initial phase $\Phi_1$ of a descent during which the aerial vehicle 510 determines poses with respect to the environment using the navigation sensors and poses with respect to the docking station 560 using a downward-oriented visual sensor, such as a camera of any type or form. During the initial phase $\Phi_1$, the aerial vehicle 510 may determine whether such poses converge prior to a transition position $P_2$, which may also be provided at a predetermined altitude above the docking station 560. For example, where the docking station 560 includes a plurality of visual markings provided in a predetermined arrangement or pattern, the aerial vehicle 510 may capture and process images of the docking station 560, detect the visual markings within the images, and determine correspondence between detections of the visual markings in any manner. Poses of the aerial vehicle 510 may be determined from such detections where a sufficient number of the markings are present within a field of view of a visual sensor, e.g., at least three, according to a perspective-n-point algorithm, or in any other manner.

If the poses with respect to the environment determined using the navigation sensors and poses with respect to the docking station 560 determined using a downward-oriented visual sensor do not converge prior to the aerial vehicle 510 reaching the transition position $P_2$, the aerial vehicle 510 may hover and continue to capture images and determine such poses, until the poses are determined to have converged. If the aerial vehicle 510 does not determine that the poses have converged after a predetermined time, e.g., a timeout, the aerial vehicle 510 may abort the docking evolution or land in another location.

If the aerial vehicle 510 determines that the poses with respect to the environment determined using the navigation sensors and poses with respect to the docking station 560 determined using a downward-oriented visual sensor have converged prior to reaching the transition position $P_2$, however, the aerial vehicle 510 may begin a second phase $\Phi_2$ of the descent toward the docking station 560, and determine poses with respect to the docking station 560 during the second phase $\Phi_2$ of the descent based on images captured using the downward-oriented visual sensors and also data generated by inertial sensors of the aerial vehicle 510, e.g., an inertial measurement unit having one or more gyroscopes, one or more accelerometers, one or more compasses or other magnetometers, or other components. During the second phase $\Phi_2$ of the descent, the aerial vehicle 510 may adjust its position or orientation, as necessary, to properly align the aerial vehicle 510 with respect to the docking station 560, until the aerial vehicle 510 reaches a final position $P_3$ altitude below which one or more of the visual markings of the docking station do not appear within a field of view of a downward-oriented camera.

If the aerial vehicle 510 is unable to continue determining poses with respect to the docking station 560 using either images captured by the downward-oriented visual sensors or inertial sensors prior to reaching the final position $P_3$, e.g., on account of drift, interference, or for any other reason, the aerial vehicle 510 may hover or abort the docking evolution, or attempt to land in another location.

If the aerial vehicle 510 successfully continues to determine poses with respect to the docking station 560 prior to and upon reaching the final position $P_3$, however, the aerial vehicle 510 may begin a third phase $\Phi_3$ of the descent toward the docking station 560, and determine poses with respect to the docking station 560 during the third phase $\Phi_3$ of the descent based on data generated by the inertial sensors of the aerial vehicle 510 and ranges to the docking station 560 determined by a downward-oriented range sensor, e.g., a time-of-flight sensor. During the third phase $\Phi_3$ of the descent, the aerial vehicle 510 may adjust its position or orientation, as necessary, to maintain the aerial vehicle 510 in a proper alignment with respect to the docking station 560, as the aerial vehicle 510 descends to a docked position $P_4$ within the docking station 560. The docking station 560 may have any number of depressions, cavities or other openings having sloped surfaces and receptacles (or recesses or other openings) that are oriented or aligned to correspond to landing extensions of the aerial vehicle 510, such that ends of the landing extensions may be guided into such receptacles. The aerial vehicle 510 may then isolate power to one or more propulsion motors, and thereby complete the docking evolution.

In accordance with one or more implementations, an aerial vehicle, or drone, may include landing feet, and a dock includes receptacles, recesses or other openings that are configured to receive the landing feet. The dock may further include sloped surfaces that are provided and aligned to facilitate sliding of the landing feet across the sloped surfaces during landing in a manner that directs the landing feet toward the recesses. The sloped surfaces may also include openings defined therethrough to facilitate smooth sliding while minimizing backdraft from air propelled downward by rotors of the drone during landing. The dock may also include sources of light, e.g., light-emitting diodes, or "LED," or reflectors of light, that are arranged in an asymmetric pattern and may be detected within images captured by the aerial vehicle to facilitate orientation of the drone during landing. The dock includes a charging connector, and a privacy cover that is aligned to cover a camera of the aerial vehicle while it is received within the dock.

The contents of U.S. patent application Ser. No. 16/584, 721 are incorporated by reference herein in their entirety.

Although some embodiments of the present disclosure show the use of autonomous vehicles in support of one or more applications or functions (e.g., security applications or functions) within indoor spaces of a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

Furthermore, although some of the signals or energy that are described as being transmitted or received by one or more transceivers or other sensors herein have specific labels of protocols, standards or frequency bands (e.g., Wi-Fi or Bluetooth), those of ordinary skill in the pertinent arts will recognize that signals or energy may be transmitted or received by one or more transceivers or other sensors at any frequency or at any intensity level, and according to any protocol or standard, in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method for executing a docking evolution at a docking station by an aerial vehicle, wherein the aerial vehicle comprises:

a plurality of propulsion motors, wherein each of the plurality of propulsion motors is coupled to a propeller and configured to rotate the propeller at one or more selected speeds;

a camera, wherein the camera has a field of view extending normal to a surface on an underside of the aerial vehicle;

a navigation sensor;

an inertial measurement unit comprising at least one gyroscope, at least one accelerometer and at least one magnetometer;

a range sensor, wherein the range sensor is configured to emit light below the aerial vehicle and capture reflections of the emitted light; and one or more computer processors, wherein the docking station comprises a frame having a plurality of visual markings arranged in an asymmetric pattern on an upper surface of the frame, and wherein the method comprises:

operating, by the aerial vehicle, one or more of the propulsion motors to cause the aerial vehicle to travel to a first position associated with the docking evolution;

initiating, by the aerial vehicle, a first phase of the docking evolution with the aerial vehicle within a vicinity of the first position, wherein initiating the first phase of the docking evolution comprises causing the aerial vehicle to descend in altitude;

during the first phase, capturing, by the camera, a first plurality of images;

detecting, by the aerial vehicle, the plurality of visual markings depicted within at least one of the first plurality of images;

calculating, by the aerial vehicle, at least a first pose of the aerial vehicle based at least in part on the plurality of visual markings depicted within the at least one of the first plurality of images;

capturing data by the navigation sensor;

calculating, by the aerial vehicle, at least a second pose of the aerial vehicle based at least in part on the data captured by the navigation sensor; and prior to arriving at a second position, determining that the first pose is consistent with the second pose; and initiating, by the aerial vehicle, a second phase of the docking evolution with the aerial vehicle within a vicinity of the second position, wherein initiating the second phase of the docking evolution comprises causing the aerial vehicle to descend in altitude;

during the second phase, capturing, by the camera, a second plurality of images;

detecting, by the aerial vehicle, the plurality of visual markings depicted within at least one of the second plurality of images;

capturing first data by the inertial measurement unit;

calculating, by the aerial vehicle, at least a third pose of the aerial vehicle based at least in part on the plurality of visual markings depicted within the at least one of the second plurality of images and the first data; and prior to arriving at a third position, determining that the third pose is consistent with the second pose; and initiating, by the aerial vehicle, a third phase of the docking evolution with the aerial vehicle within a vicinity of the third position, wherein initiating the third phase of the docking evolution comprises causing the aerial vehicle to descend in altitude; and during the third phase, capturing, by the camera, a third plurality of images;

detecting, by the aerial vehicle, at least one of the plurality of visual markings depicted within at least one of the third plurality of images;

capturing second data by the inertial measurement unit;

determining, by the range sensor, ranges to at least a portion of the docking station below the aerial vehicle;

calculating, by the aerial vehicle, at least a fourth pose of the aerial vehicle based at least in part on the plurality of visual markings depicted within the at least one of the third plurality of images and the second data.

2. The method of claim 1, wherein detecting the plurality of visual markings depicted within at least one of the first plurality of images comprises:

identifying portions of the at least one of the first plurality of images corresponding to one of the plurality of visual markings by one of binarization, thresholding or segmentation;

projecting the portions of the at least one of the first plurality of images onto a horizontal plane corresponding to a fourth position; and determining that sizes and positions of the portions of the at least one of the first plurality of images projected onto the horizontal plane corresponding to the fourth position are consistent with the asymmetric pattern.

3. The method of claim 1, wherein each of the plurality of visual markings is one of a light-emitting diode, a reflector, a symbol or a character arranged in the asymmetric pattern on the upper surface of the frame within a depression.

4. The method of claim 1, wherein the frame of the docking station is disposed within a housing having a flat base and walls extending normal to the base, wherein the walls define an upper rim of the housing, wherein the frame defines a depression having an edge with a size and a shape corresponding to the upper rim of the housing, a bottom section, and angled edge sections descending from the edge to the bottom section, wherein the bottom section has a substantially square shape, and wherein the frame further comprises a plurality of slit openings on each of the angled edge sections and the bottom section.

5. A method comprising:

causing an aerial vehicle to descend below a first position;

capturing first data by at least one navigation sensor of the aerial vehicle;

determining, by the aerial vehicle, a first pose of the aerial vehicle based at least in part on the first data;

capturing at least a first image by at least a first camera of the aerial vehicle, wherein the first camera has a field of view that extends below the aerial vehicle;

detecting a plurality of markings depicted within the first image, wherein the markings are provided in an asymmetric pattern on at least one surface of a docking station;

calculating a second pose of the aerial vehicle based at least in part on the plurality of markings depicted within the first image;

determining that the first pose is consistent with the second pose, wherein that the first pose is consistent with the second pose is determined with the aerial vehicle above a second position;

in response to determining that the first pose is consistent with the second pose with the aerial vehicle above the second position, causing the aerial vehicle to descend below the second position;

capturing second data by at least one inertial sensor of the aerial vehicle;

capturing at least a second image by at least the first camera;

detecting the plurality of markings depicted within the second image;

calculating a third pose of the aerial vehicle based at least in part on the second data and the plurality of markings depicted within the second image, wherein the third pose is calculated with the aerial vehicle above a third position, and wherein the third position is above the docking station; and causing the aerial vehicle to land on the docking station based at least in part on the third pose.

6. The method of claim 5, comprising:

prior to causing the aerial vehicle to descend below the first position, causing the aerial vehicle to take off from the docking station in a fourth position, wherein the method further comprises:

selecting the first position based at least in part on the fourth position.

7. The method of claim 6, wherein selecting the first position comprises:

selecting a vertical offset above the fourth position based at least in part on at least an attribute of the at least one navigation sensor or at least an attribute of the first camera, wherein the first position is provided at an altitude corresponding to the vertical offset above the fourth position.

8. The method of claim 6, further comprising: determining a fifth position corresponding to at least a portion of an obstruction within a vicinity of the docking station, wherein the first position is provided at not less than a predetermined distance from the fifth position.

9. The method of claim 6, wherein detecting the plurality of markings depicted within the first image comprises:

identifying portions of the first image corresponding to one of the plurality of markings by one of binarization, thresholding or segmentation;

projecting the portions of the first image onto a horizontal plane corresponding to the fourth position; and determining that sizes and positions of the portions of the first image projected onto the horizontal plane corresponding to the fourth position are consistent with the asymmetric pattern.

10. The method of claim 5, wherein the docking station comprises:

a housing; and a frame disposed within the housing, wherein the frame defines a depression having an edge with a size and a shape corresponding to an upper rim of the housing, a bottom section, and angled edge sections descending from the edge to the bottom section, wherein the bottom section has a substantially square shape, and wherein the plurality of markings are arranged in the asymmetric pattern on an upper surface of the frame within the depression.

11. The method of claim 10, wherein each of the plurality of markings is one of a light-emitting diode, a reflector, a symbol or a character arranged in the asymmetric pattern on the upper surface of the frame within the depression.

12. The method of claim 5, wherein determining that the first pose is consistent with the second pose comprises:

calculating a distance between at least a portion of the first pose and at least a portion of the second pose; and determining that the distance is less than a predetermined threshold.

13. The method of claim 5, comprising:

capturing at least a third image by at least the first camera of the aerial vehicle, wherein the third image is captured with the aerial vehicle at a fourth position, and wherein the fourth position is below the first position and above the second position;

detecting the plurality of markings depicted within the third image;

calculating a fourth pose of the aerial vehicle based at least in part on the plurality of markings depicted within the third image; and causing the aerial vehicle to hover above the second position, wherein the first image is captured with the aerial vehicle hovering above the second position.

14. The method of claim 5, wherein determining that the first pose is consistent with the second pose comprises:

determining that first data corresponding to the first pose is consistent with second data corresponding to the second pose, wherein the first data comprises a first set of coordinates of the aerial vehicle and a first yaw angle of the aerial vehicle, and wherein the second data comprises a second set of coordinates of the aerial vehicle and a second yaw angle of the aerial vehicle.

15. The method of claim 5, wherein causing the aerial vehicle to land on the docking station based at least in part on the third pose comprises:

determining an orientation of the docking station based at least in part on the plurality of markings depicted within the second image;

selecting an angle based at least in part on the orientation of the docking station and the third pose; and causing the aerial vehicle to rotate about a yaw axis of the aerial vehicle by the angle.

16. The method of claim 5, wherein the aerial vehicle comprises an inertial measurement unit comprising at least one gyroscope, at least one accelerometer and at least one magnetometer, and wherein the at least one inertial sensor comprises at least one of the at least one gyroscope, the at least one accelerometer or the at least one magnetometer.

17. The method of claim 5, wherein the at least one navigation sensor is a time-of-flight sensor oriented to emit light below the aerial vehicle and to capture reflections of the emitted light off one or more surfaces.

18. The method of claim 5, wherein the first camera is one of a visual camera or an infrared camera.

19. The method of claim 5, wherein the at least one navigation sensor comprises at least one of a light detection and ranging sensor, a time-of-flight sensor, an inertial measurement unit or a second camera.

20. An aerial vehicle comprising:

a plurality of propulsion motors, wherein each of the plurality of propulsion motors is coupled to a propeller and configured to rotate the propeller at one or more selected speeds;

a first camera, wherein the first camera has a field of view extending normal to a surface on an underside of the aerial vehicle;

a navigation sensor;

an inertial measurement unit comprising at least one gyroscope, at least one accelerometer and at least one magnetometer;

a range sensor, wherein the range sensor is configured to emit light below the aerial vehicle and capture reflections of the emitted light;

at least one memory component having one or more sets of instructions stored thereon; and one or more computer processors, wherein the one or more sets of instructions, when executed by the aerial vehicle, cause the aerial vehicle to at least:

operate the one or more propulsion motors to cause the aerial vehicle to travel to a first position associated with a docking evolution;

initiate a first phase of the docking evolution with the aerial vehicle within a vicinity of the first position;

during the first phase, operate the one or more propulsion motors to cause the aerial vehicle to descend in altitude below the first position;

capture a first plurality of images by the first camera;

detect a plurality of visual markings depicted within at least one of the first plurality of images;

calculate at least a first pose of the aerial vehicle based at least in part on the plurality of visual markings depicted within the at least one of the first plurality of images;

capture first data by the navigation sensor;

calculate at least a second pose of the aerial vehicle based at least in part on the first data; and prior to descending below a second position, determine that the first pose is consistent with the second pose; and initiate a second phase of the docking evolution;

during the second phase, capture a second plurality of images by the first camera;

detect the plurality of visual markings depicted within at least one of the second plurality of images;

capture second data by the inertial measurement unit;

calculate at least a third pose of the aerial vehicle based at least in part on the plurality of visual markings depicted within the at least one of the second plurality of images and the second data; and prior to descending below a third position, determine that the third pose is consistent with the second pose; and initiate a third phase of the docking evolution; and during the third phase, capture a third plurality of images;

detect at least one of the plurality of visual markings depicted within at least one of the third plurality of images;

capture third data by the inertial measurement unit;

determine ranges to at least a portion of a docking station below the aerial vehicle by the range sensor; and calculate at least a fourth pose of the aerial vehicle based at least in part on the plurality of visual markings depicted within the at least one of the third plurality of images and the third data.

21. A drone comprising:

a plurality of propulsion motors, wherein each of the plurality of propulsion motors is coupled to a propeller and configured to rotate the propeller at one or more selected speeds;

a first camera, wherein the first camera has a field of view extending normal to a surface on an underside of the drone;

a navigation sensor;

an inertial measurement unit comprising at least one gyroscope, at least one accelerometer and at least one magnetometer;

a range sensor, wherein the range sensor is configured to emit light below the drone and capture reflections of the emitted light;

at least one memory component having one or more sets of instructions stored thereon; and one or more computer processors, wherein the one or more sets of instructions, when executed using the one or more processors, cause the drone to perform operations comprising:

transitioning to a first docking phase;

determining, based on a first image generated using the first camera, a first pose of the drone relative to a dock;

determining, based on first data generated using the navigation sensor, a second pose of the drone relative to a first coordinate system;

composing, using the first pose and the second pose, a third pose of the dock relative to the first coordinate system for a first time;

determining, based on a second image generated using the first camera, a fourth pose of the drone relative to the dock;

determining, based on second data generated using the navigation sensor, a fifth pose of the drone relative to a first coordinate system;

composing, using the first pose and the second pose, a sixth pose of the dock relative to the first coordinate system for a second time;

determining, based on the fourth pose, a first pose estimate of the dock relative to the first coordinate system for the second time;

based on the sixth pose of the dock relative to the first coordinate system, operating the one or more propulsion motors to navigate the drone;

determining a first distance between the sixth pose and the first pose estimate;

determining one or more uncertainty values based on the first pose estimate; and based on the one or more uncertainty values, transitioning to a second docking phase.

22. The drone of claim 21, wherein the navigation sensor is a camera, and wherein the one or more sets of instructions comprise instructions for a visual simultaneous localization and mapping algorithm.

23. The drone of claim 21, wherein the navigation sensor is a LIDAR sensor.

24. The drone of claim 21, wherein the first distance is a Mahalanobis distance.

25. The drone of claim 21, wherein the one or more sets of instructions, when executed using the one or more processors, further cause the drone to perform operations comprising:

based on the first distance, resetting the first pose estimate.

* * * * *